US012298562B2

(12) United States Patent
Lawson et al.

(10) Patent No.: US 12,298,562 B2
(45) Date of Patent: *May 13, 2025

(54) METHOD AND SYSTEM FOR ROTATIONAL ALIGNMENT OF POLARIZATION MAINTAINING FIBERS

(71) Applicant: RAM Photonics LLC, San Diego, CA (US)

(72) Inventors: Joseph Lawson, Rochester, NY (US); Jordan Leidner, Rochester, NY (US); Per Adamson, Conesus, NY (US)

(73) Assignee: RAM Photonics Industrial, LLC, Webster, NY (US)

( * ) Notice: Subject to any disclaimer, the term of this patent is extended or adjusted under 35 U.S.C. 154(b) by 234 days.

This patent is subject to a terminal disclaimer.

(21) Appl. No.: 17/733,319

(22) Filed: Apr. 29, 2022

(65) Prior Publication Data

US 2022/0350091 A1 Nov. 3, 2022

Related U.S. Application Data

(60) Provisional application No. 63/246,849, filed on Sep. 22, 2021, provisional application No. 63/181,870, (Continued)

(51) Int. Cl.
*G02B 6/255* (2006.01)
*G02B 6/42* (2006.01)

(52) U.S. Cl.
CPC ......... *G02B 6/2555* (2013.01); *G02B 6/4206* (2013.01); *G02B 6/4214* (2013.01); *G02B 6/4221* (2013.01); *G02B 6/4227* (2013.01)

(58) Field of Classification Search
CPC .. G02B 6/2555; G02B 6/4206; G02B 6/4214; G02B 6/4221; G02B 6/4227; G02B 6/024
See application file for complete search history.

(56) References Cited

U.S. PATENT DOCUMENTS

| | | | | |
|---|---|---|---|---|
| 4,911,524 A | * | 3/1990 | Itoh | G02B 6/2555 |
| | | | | 385/97 |
| 5,149,350 A | * | 9/1992 | Itoh | G02B 6/3805 |
| | | | | 356/73.1 |

(Continued)

OTHER PUBLICATIONS

PCT/US2022/026961 , "International Preliminary Report on Patentability", Nov. 9, 2023, 8 pages.

(Continued)

*Primary Examiner* — John Bedtelyon
(74) *Attorney, Agent, or Firm* — KILPATRICK TOWNSEND & STOCKTON LLP

(57) ABSTRACT

Various embodiments and methods related to an optical fiber alignment system are provided herein. The optical fiber alignment system includes a controller and a rotation stage having a central axis, a first end, and a second end. The central axis extends from the first end to the second end of the rotation stage. The rotation stage includes an optical fiber channel extending from the first end of the rotation stage to the second end of the rotation stage and may be operationally coupled with the controller. The rotation stage is configured to rotate about the central axis of the rotation stage. The optical fiber alignment system includes a light source positioned to emit light onto the optical fiber channel at an oblique angle from the central axis of the rotation stage. The optical fiber alignment system includes an image sensor positioned adjacent to the second end of the rotation stage.

11 Claims, 13 Drawing Sheets

Related U.S. Application Data filed on Apr. 29, 2021, provisional application No. 63/181,873, filed on Apr. 29, 2021, provisional application No. 63/181,869, filed on Apr. 29, 2021.

(56) References Cited

U.S. PATENT DOCUMENTS

| | | | |
|---|---|---|---|
| 6,052,505 | A | 4/2000 | Bice et al. |
| 9,057,838 | B2 | 6/2015 | Vytran |
| 10,620,372 | B2 * | 4/2020 | Matsui .................. G01B 11/27 |
| 2002/0009271 | A1 * | 1/2002 | Herve .................. G02B 6/2551 |
| | | | 385/98 |
| 2002/0141723 | A1 | 10/2002 | Kent et al. |
| 2004/0258370 | A1 | 12/2004 | Bush et al. |
| 2010/0209049 | A1 * | 8/2010 | Zheng .................. G02B 6/2555 |
| | | | 356/73.1 |
| 2013/0209112 | A1 | 8/2013 | Witzens |
| 2018/0246007 | A1 | 8/2018 | Saito et al. |
| 2024/0004136 | A1 * | 1/2024 | Kremp ................. G02B 6/2551 |

OTHER PUBLICATIONS

Application No. PCT/US2022/026961, International Search Report and Written Opinion, Mailed on Aug. 30, 2022, 9 pages.

* cited by examiner

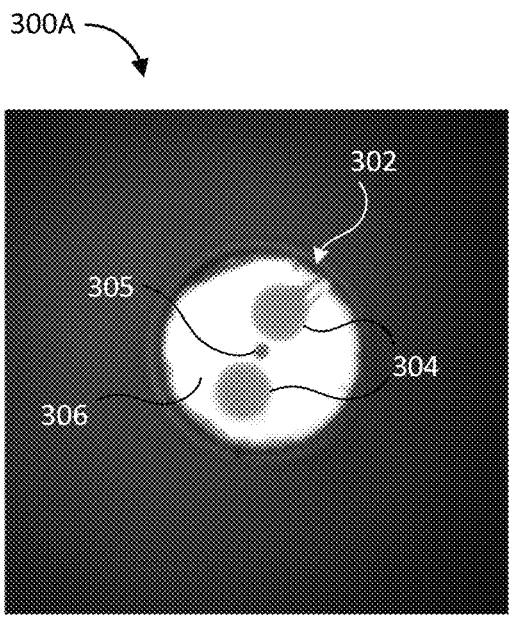
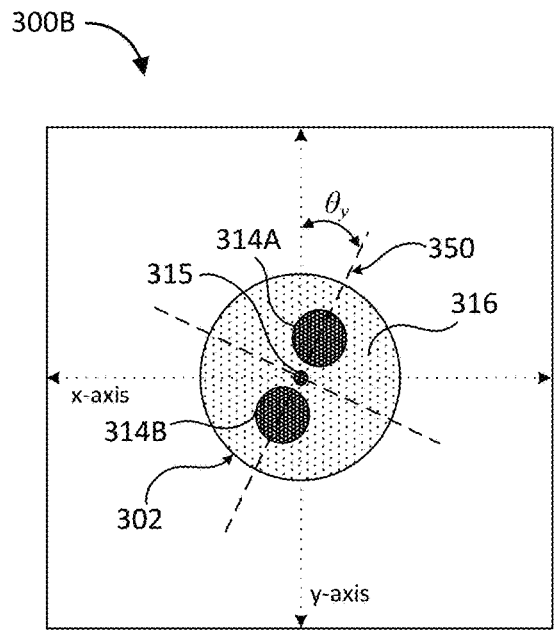
FIG. 3A  FIG. 3B
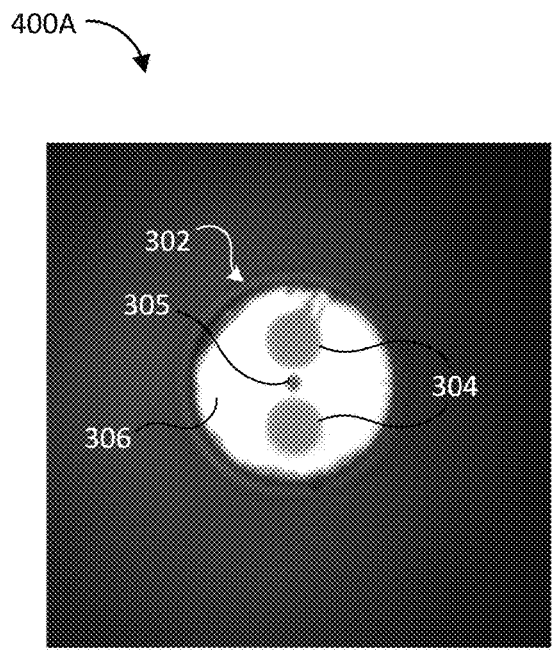
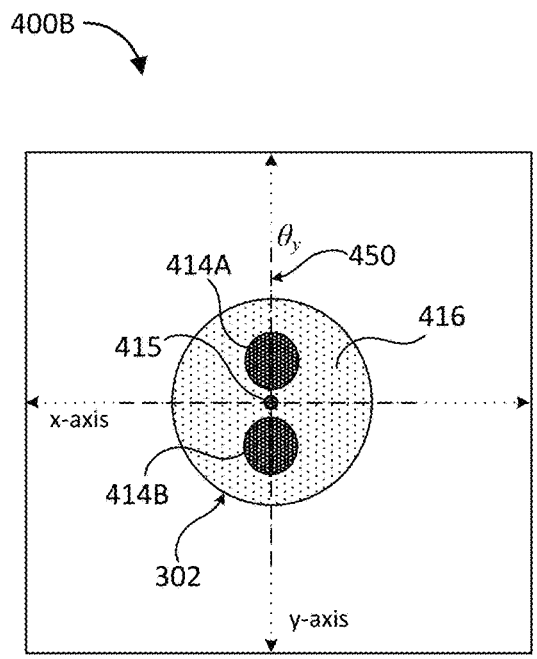
FIG. 4A  FIG. 4B

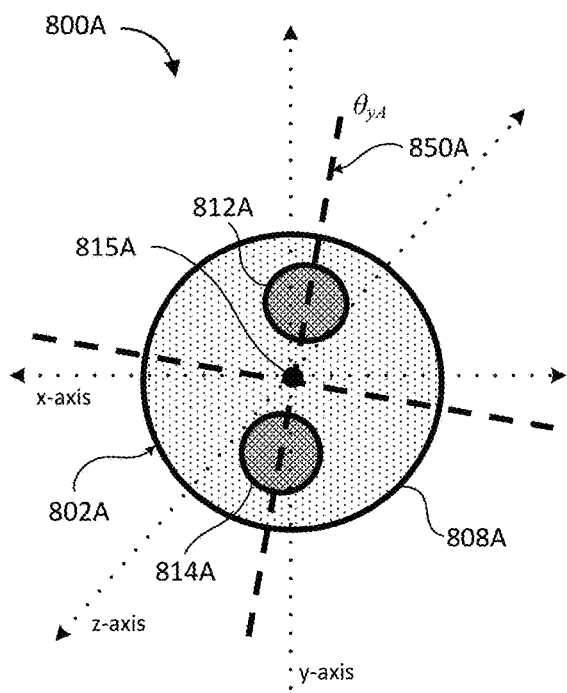
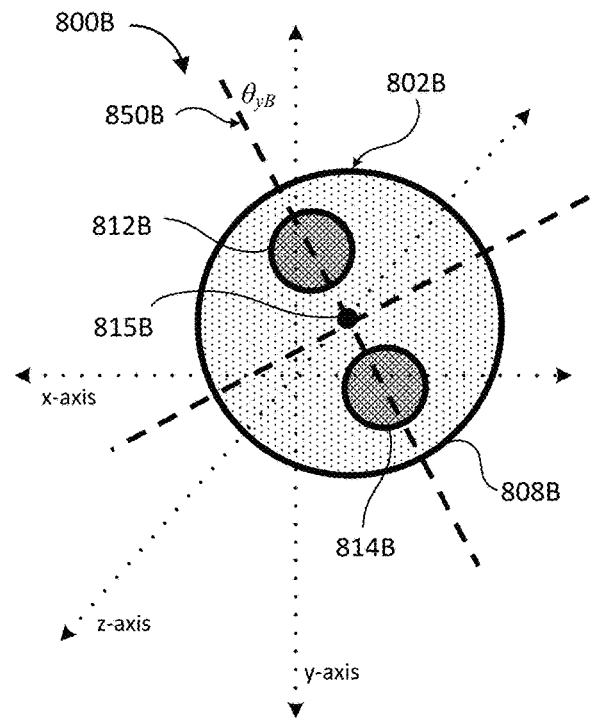
FIG. 8A
FIG. 8B
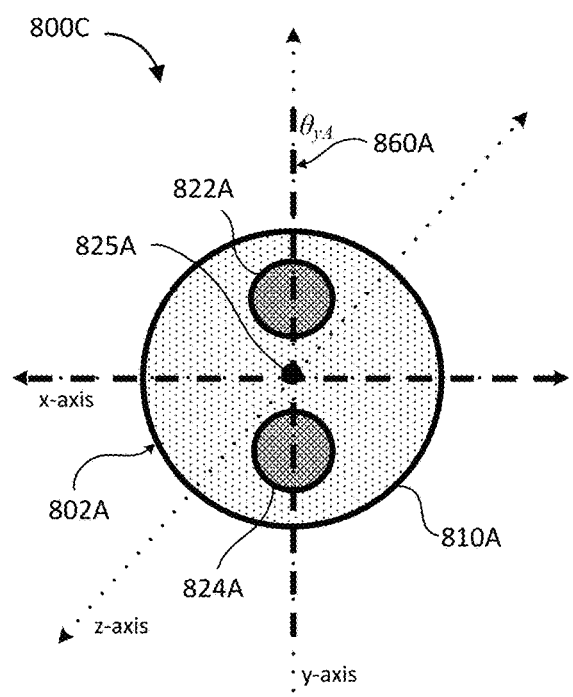
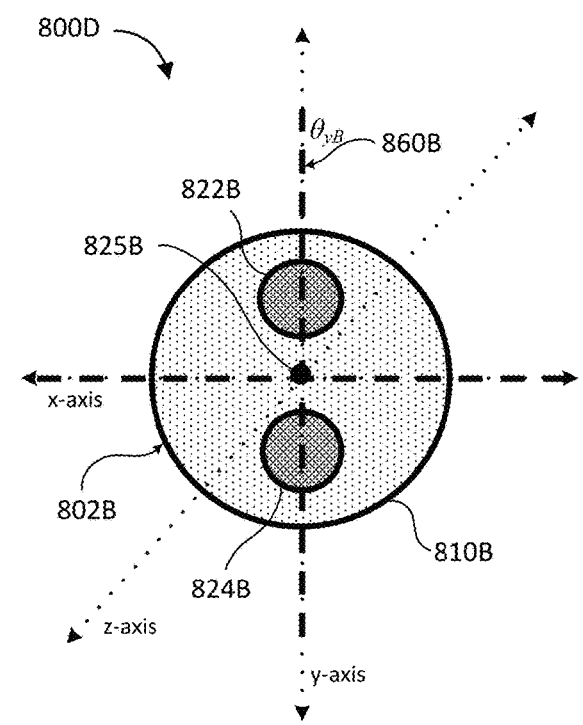
FIG. 8C
FIG. 8D

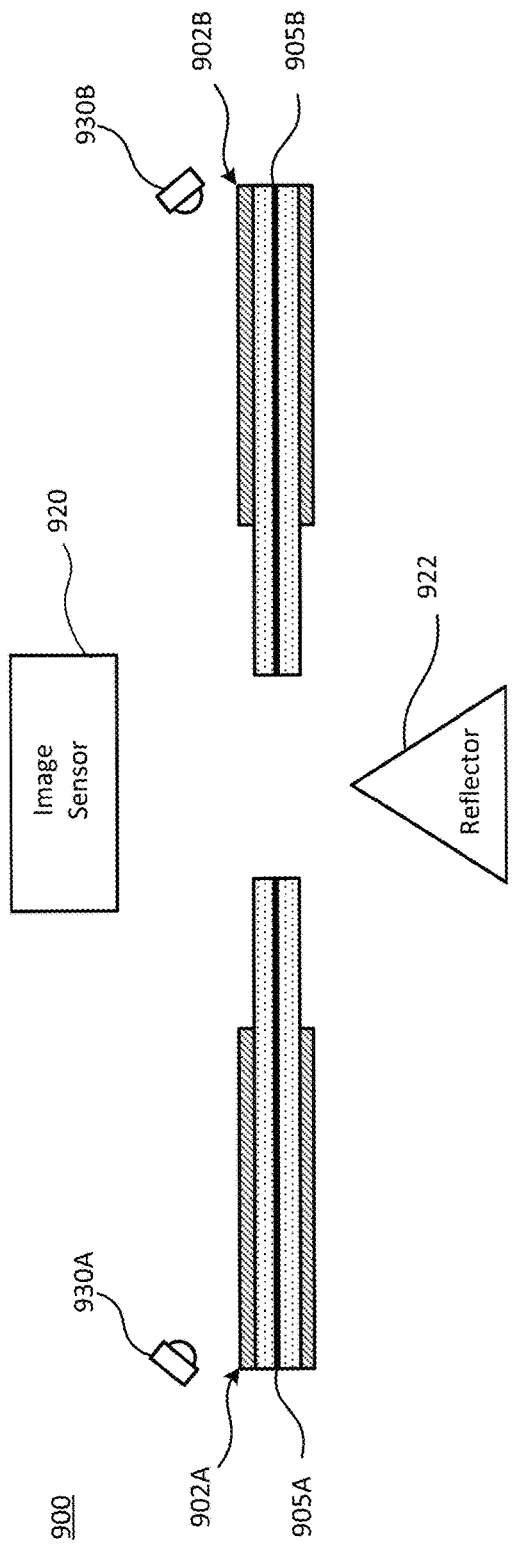
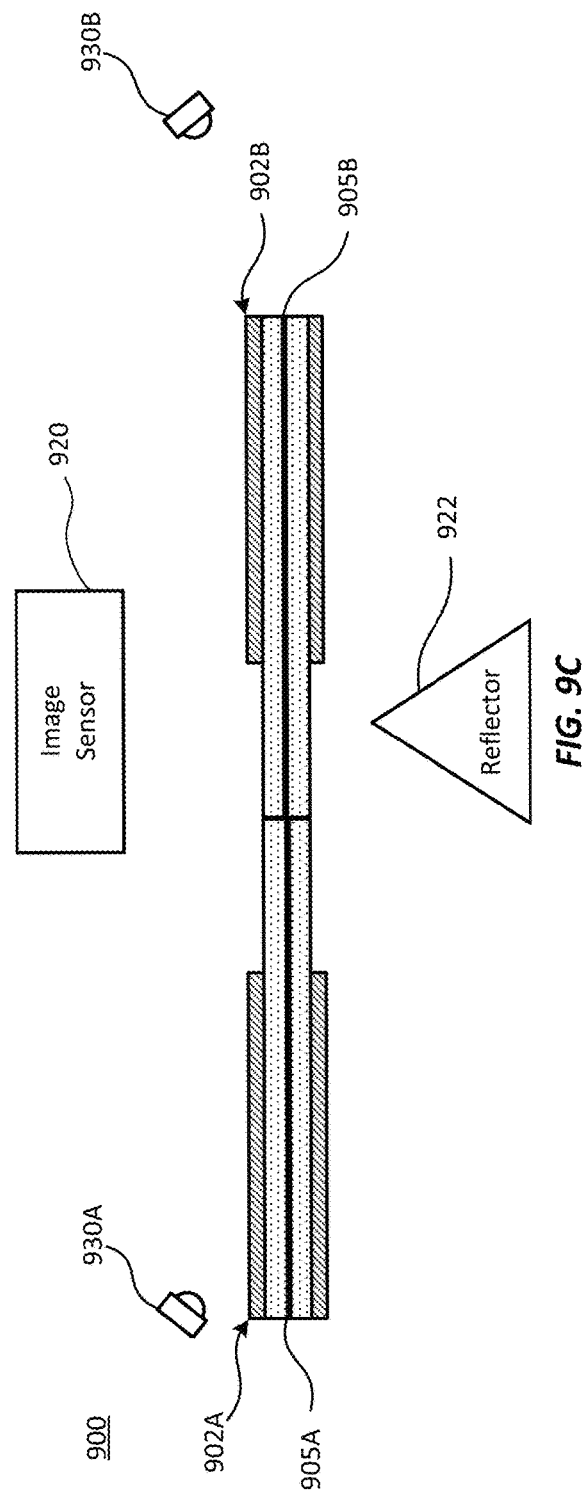

METHOD AND SYSTEM FOR ROTATIONAL ALIGNMENT OF POLARIZATION MAINTAINING FIBERS

CROSS-REFERENCES TO RELATED APPLICATIONS

This application claims the benefit of and priority to U.S. Provisional Application No. 63/181,869, filed on Apr. 29, 2021, U.S. Provisional Application No. 63/246,849, filed on Sep. 22, 2021, U.S. Provisional Application No. 63/181,870, filed on Apr. 29, 2021, and U.S. Provisional Application No. 63/181,873, filed on Apr. 29, 2021 which are hereby incorporated by reference in its entirety for all purposes.

BACKGROUND OF THE INVENTION

Polarization maintaining fibers have structures that support propagation of light in predetermined polarizations. When polarization maintaining fibers are spliced together or bonded to optical elements, the polarization maintaining fibers can be aligned during splicing and/or bonding.

Despite the progress made in the development of fiber alignment systems, there is a need in the art for improved methods and systems related to fiber alignment systems.

SUMMARY OF THE INVENTION

The present disclosure relates generally to methods and systems related to optical systems including polarization maintaining fibers. More particularly, embodiments of the present invention provide methods and systems that can be used to identify and determine the rotational alignment of the polarization axis of a polarization maintaining fiber. In a particular embodiment, the polarization axis, which can be related to the orientation of the stress rods and/or the fiber core, can be determined and aligned to a predetermined direction in advance of fiber splicing to an optical element, including another polarization maintaining fiber. The disclosure is applicable to a variety of applications in lasers and optics, including fiber laser implementations.

To align a polarization maintaining fiber with an external body, it may be desirable to maintain the polarization of the light output by the polarization maintaining fiber between the polarization maintaining fiber and the external body. For example, optical fibers are often spliced to various external bodies, such as another optical fiber or a piece of optical equipment, and precise alignment between the optical fiber and the external body is utilized to maintain the polarization state of the light in the external body. One method of maintaining polarization of the light output by a polarization maintaining fiber between the polarization maintaining fiber and the external body is to align the stress rods and/or core of the polarization maintaining fiber with the stress rods, core, and/or another component of the external body. Thus, proper alignment of a polarization maintaining fiber often requires identification and precise alignment of the stress rods and/or core of the polarization maintaining fiber.

Various embodiments and methods related to an optical fiber alignment system are provided herein. The optical fiber alignment system may include a controller and a rotation stage having a central axis, a first end, and a second end. The central axis may extend from the first end to the second end of the rotation stage. The rotation stage may include an optical fiber channel extending from the first end of the rotation stage to the second end of the rotation stage and may be operationally coupled with the controller. The rotation stage may be configured to rotate about the central axis of the rotation stage. The optical fiber alignment system may also include a light source positioned to emit light onto the optical fiber channel at an oblique angle from the central axis of the rotation stage. For example, the oblique angle may be less than 90° from the central axis of the rotation stage. The optical fiber alignment system may also include an image sensor positioned adjacent to the second end of the rotation stage. The image sensor may be positioned to generate an image of an emission face of an optical fiber disposed within the optical fiber channel and operationally coupled with the controller. Optionally, the image sensor may be positioned at the second end of the rotation stage.

In some examples, the optical fiber alignment system includes a static immobilizer. The static immobilizer may be in contact with a portion of the optical fiber and may be configured to secure the optical fiber onto the rotation stage. For example, the static immobilizer may be a vacuum chuck. Optionally, the static immobilizer is positioned between the rotation stage and the image sensor. In some embodiments, the rotation stage may include a drive assembly and a rotator assembly.

In some examples, the optical fiber alignment system may include a mechanical immobilizer. The mechanical immobilizer may be configured to secure the optical fiber when the rotation stage rotates about the central axis of the rotation stage. For example, the mechanical immobilizer may include two pads positioned on either side of the optical fiber channel and may be configured to contact the optical fiber when positioned in the optical fiber channel. Optionally, the mechanical immobilizer is positioned between the rotation stage and the static immobilizer. In some examples, an optical fiber may be provided in the optical fiber channel having one or more stress rods.

A method of aligning an optical fiber is also described herein. The method may include placing an optical fiber onto a rotation stage and securing the optical fiber on the rotation stage. For example, securing the optical fiber on the rotation stage may include contacting the optical fiber with a vacuum chuck and inducing a vacuum on the optical fiber using the vacuum chuck. The method may also include illuminating the optical fiber on the rotation stage and collecting an initial image of an emission face of the optical fiber calculating a rotational offset of the optical fiber based on the initial image. The method may also include rotating the optical fiber on the rotation stage if the rotational offset of the optical fiber is not within a tolerance. In examples, the method includes iteratively collecting at least one more additional image of the emission face of the optical fiber and releasing the optical fiber if the rotational offset of the optical fiber is within the tolerance. Optionally, prior to rotating the optical fiber on the rotation stage, the method includes releasing the optical fiber.

In some embodiments, the method includes calculating a rotation angle based on the rotational offset and rotating the optical fiber on the rotation stage based on the rotational offset involves rotating the optical fiber to the rotation angle on the rotation stage. In some examples, the method includes calculating a translational offset of the optical fiber and determining if the translational offset of the optical fiber is within the tolerance. In some embodiments, calculating the rotational offset of the optical fiber based on the initial image includes identifying a first region and a second region in the initial image of the emission face of the optical fiber, calculating a degree of rotational offset of the optical fiber based on the first region and the second region, and calculating the rotational offset based on the degree of rotational offset. In examples, the method includes identifying a first region and a second region in the initial image of the emission face of the optical fiber, calculating a degree of rotational offset of the optical fiber based on the first region and the second region, and calculating the rotational offset based on the degree of rotational offset. In some embodiments, the method may include identifying a central region of the optical fiber in the initial image of the emission face of the optical fiber, determining a vertical axis of the optical fiber based on the central region, and determining a vertical rotation offset from the vertical axis for the first region and the second region in the emission face. Optionally, the method includes determining a translational offset of the optical fiber. In some examples, the method includes contacting the optical fiber with a vacuum chuck; and inducing a vacuum on the optical fiber using the vacuum chuck.

Numerous benefits are achieved by way of the present disclosure over conventional techniques. For example, embodiments of the present disclosure, provide methods and systems for determining the position and orientation of stress rods within an optical fiber. Advantageously, these methods and systems allow for alignment of the polarization axis of an optical fiber with an external body without the need for costly or complex illumination setups and techniques. Additionally, embodiments of the present invention are characterized by a wide tolerance range, thereby allowing for variation in approach without impacting the results. For example, a laser does not have to be precisely aligned with the polarization of the specific optical fiber to accurately identify the stress rods. Instead, a light source may be applied within a wide range of angles to identify the stress rods of an optical fiber. Moreover, these methods and systems are agnostic to the type of fiber, allowing for alignment of various types of fibers. These and other embodiments of the disclosure, along with many of its advantages and features, are described in more detail in conjunction with the text below and corresponding figures.

BRIEF DESCRIPTION OF THE DRAWINGS

FIG. 3A is an exemplary emission image depicting an optical fiber having a rotational offset obtained using the optical fiber alignment system illustrated in FIGS. 1A-E.

FIG. 3B is a diagram illustrating a computational image used to calculate the rotational offset of the optical fiber imaged in FIG. 3A.

FIG. 4A is an exemplary emission image depicting the optical fiber of FIG. 3A after rotation to correct the rotational offset using the optical fiber alignment system illustrated in FIGS. 1A-E.

FIG. 4B is a diagram illustrating a computational image used to verify correction of the rotational offset of the optical fiber illustrated in FIG. 4A.

FIG. 8A is a diagram illustrating a first position of an emission face of a first fiber obtained using the optical fiber alignment system illustrated in FIGS. 1A-E.

FIG. 8B is a diagram illustrating a second position of an emission face of a second fiber obtained using the optical fiber alignment system illustrated in FIGS. 1A-E.

FIG. 8C is a diagram illustrating a first target position of the emission face of the first fiber obtained using the optical fiber alignment system illustrated in FIGS. 1A-E.

FIG. 8D is a diagram illustrating a second target position of the emission face of the second fiber obtained using the optical fiber alignment system illustrated in FIGS. 1A-E.

FIG. 9B is a simplified schematic diagram illustrating the components of the optical fiber alignment system after alignment of the first fiber and second fiber and prior to contacting the first fiber and the second fiber according to an embodiment of the present invention.

FIG. 9C is a simplified schematic diagram illustrating the components of the optical fiber alignment system after the first fiber and the second fiber are brought into physical contact according to an embodiment of the present invention.

DETAILED DESCRIPTION OF SPECIFIC EMBODIMENTS

The present disclosure relates generally to methods and systems related to optical systems including polarization maintaining fibers. More particularly, embodiments of the present invention provide methods and systems that can be used to identify and determine the rotational alignment of the polarization axis of a polarization maintaining fiber. In a particular embodiment, the polarization axis, which can be related to the orientation of the stress rods and/or the fiber core, can be determined and aligned to a predetermined direction in advance of fiber splicing to an optical element, including another polarization maintaining fiber. The disclosure is applicable to a variety of applications in lasers and optics, including fiber laser implementations.

Figure 1A:
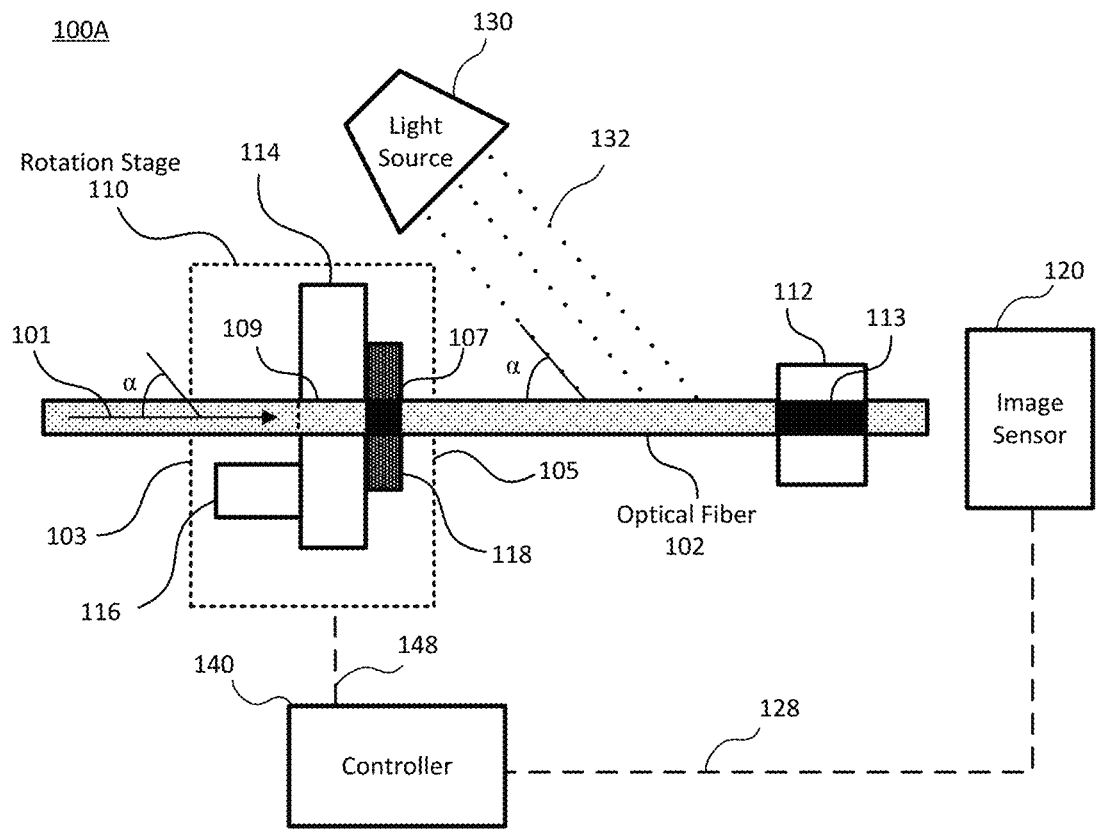
FIG. 1A is a simplified schematic diagram illustrating an optical fiber alignment system according to an embodiment of the present invention.

FIG. 1A provides a simplified schematic diagram illustrating an optical fiber alignment system 100A according to an embodiment of the present invention. Optical fiber alignment system 100A may include a rotation stage 110, an image sensor 120, a controller 140, and a light source 130. Rotation stage 110 may include a central axis 101, a first end 103, and a second end 105. The central axis 101 may extend from the first end 103 to the second end 105 of rotation stage 110. Rotation stage 110 may be configured to rotate about the central axis 101. To facilitate rotation, rotation stage 110 may include a drive assembly 116 and a rotator assembly 114. Drive assembly 116 may include a motor that rotates the rotator assembly 114. Rotator assembly 114 may be part of rotation stage 110. Rotation stage 110 may be configured to receive a fiber, such as optical fiber 102.

Figure 1B:
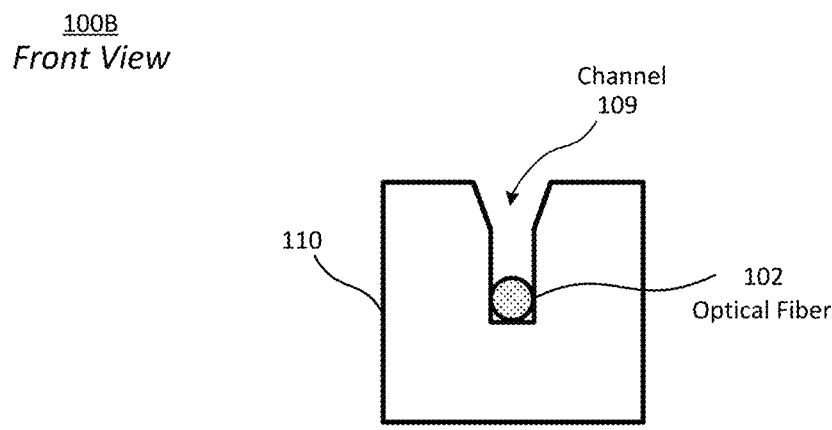
FIG. 1B is a simplified schematic diagram illustrating a front view of a portion of the optical fiber alignment system illustrated in FIG. 1A.

FIG. 1B is a simplified schematic diagram illustrating a front view of a portion of the optical fiber alignment system illustrated in FIG. 1A, particularly, front view 100B of rotation stage 110. Front view 100B may be a face-on view of the second end of rotation stage 110. As shown, rotation stage 110 may include a channel 109. Channel 109 may be an optical fiber channel through which rotation stage 110 receives optical fiber 102. Channel 109 may extend from the first end 103 of rotation stage 110 to the second end 105 of rotation stage 110. In some embodiments, channel 109 may secure optical fiber 102 within rotation stage 110, at least during rotation of rotation stage 110 about central axis 101.

To secure optical fiber 102 during rotation of rotation stage 110, optical fiber alignment system 100A may include a mechanical immobilizer 118. In some embodiments, as illustrated in FIGS. 1A and 1B, optical fiber 102 may extend out in a cantilevered fashion from channel 109 of rotation stage 110 toward image sensor 120. Mechanical immobilizer 118 may be positioned to contact a portion 107 of optical fiber 102 that extends from channel 109 toward image sensor 120. For example, mechanical immobilizer 118 may include two pads positioned on either side of optical fiber 102 that may contact optical fiber 102 during rotation. In some cases, mechanical immobilizer 118 may provide a compression force to optical fiber 102 to secure optical fiber 102 during rotation. Mechanical immobilizer 118 may be configured to secure optical fiber 102 in a fixed relationship with respect to rotation stage 110 when rotation stage 110 rotates about its central axis.

Optical fiber 102 may also be secured using static immobilizer 112 during imaging by image sensor 120. To secure optical fiber 102 within rotation stage 110 during imaging, optical fiber alignment system 100A may include a static immobilizer 112. Static immobilizer 112 may be positioned to contact a portion of optical fiber 102. For example, static immobilizer 112 may be positioned between rotation stage 110 and image sensor 120 to receive a portion 113 of optical fiber 102 extending from channel 109 toward image sensor 120. Static immobilizer 112 may secure optical fiber 102 to rotation stage 110 when image sensor 120 generates an image of the emission face of optical fiber 102. For example, static immobilizer 112 may be a vacuum chuck. In some embodiments, mechanical immobilizer 118 may be positioned between rotation stage 110 and static immobilizer 112.

Image sensor 120 may be positioned to generate an image of the emission face of optical fiber 102 when optical fiber 102 is disposed within channel 109. In some embodiments, image sensor 120 may be positioned adjacent to the second end 105 of rotation stage 110. Image sensor 120 may include any sensor that is capable of sensing light emitted from the emission face of optical fiber 102. For example, image sensor 120 may be a camera.

Image sensor 120 may be operationally coupled with controller 140 via communication line 128. Rotation stage 110 may also be operationally coupled with controller 140 via communication line 148. In some embodiments, after image sensor 120 generates an image of the emission face of optical fiber 102, image sensor 120 may send the image to controller 140 via communication line 128. Controller 140 may perform various steps of the methods described herein. For example, controller 140 may determine a rotation angle for rotation stage 110 based on the image of the emission face received from image sensor 120. Controller 140 may communicate instructions for the rotation angle to rotation stage 110 via communication line 148. In response to receiving the instructions, rotation stage 110 may rotate to the rotation angle specified by controller 140. Although not shown, in some embodiments, controller 140 may also be operationally coupled with light source 130.

Light source 130 may be positioned to emit light 132 onto channel 109. If operationally coupled with controller 140, light source 130 may receive instructions for timing of emitting light 132. Light source 130 may be any suitable source of light including a laser, a light emitting diode (LED), an arc lamp, a fiber optic illuminator, an incandescent source, a fluorescent source, a phosphorescent source, or the like. Light source 130 may emit light 132 onto channel 109 at an emission angle α. The emission angle α may be an angle that is non-perpendicular to the central axis 101 of rotation stage 110 as illustrated in FIGS. 1A-E. In some embodiments, the emission angle may be an oblique angle from the central axis of rotation stage 110. For example, the oblique angle may be less than 90°, less than 80°, less than 70°, less than 60°, less than 50°, less than 40°, less than 30°, less than 20°, or less than 10° from the central axis of rotation stage 110. As described more fully herein, the oblique angle facilitates optical coupling of emitted light 132 into optical fiber 102. The emission angle may not be congruent with channel 109. Thus, light 132 emitted by light source 130 onto channel 109 can be coupled into optical fiber 102.

Figure 1C:
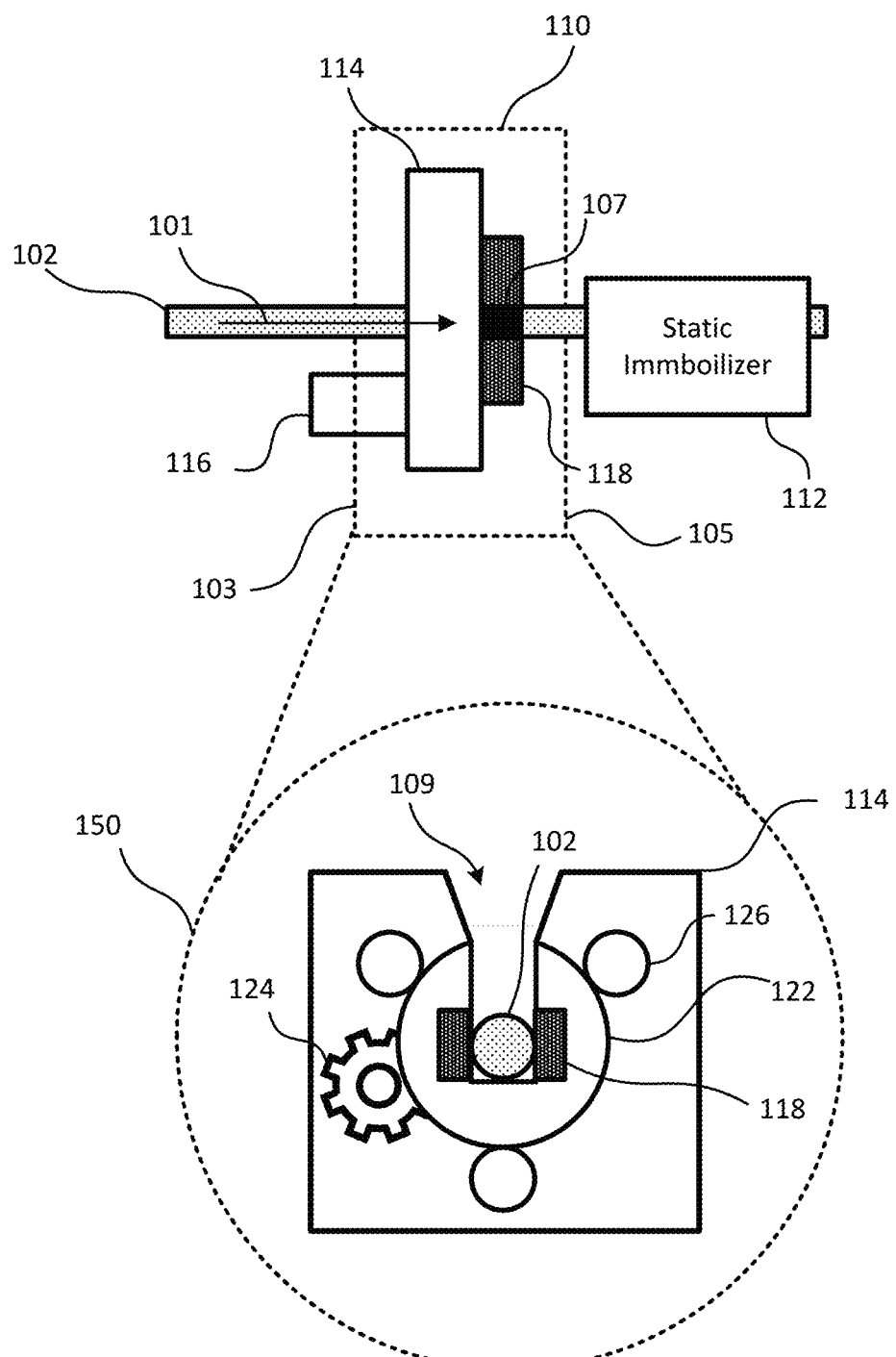
FIG. 1C is a simplified schematic diagram illustrating components of the rotation stage of the optical fiber alignment system illustrated in FIGS. 1A and 1B.

FIG. 1C provides a simplified schematic diagram 100C illustrating components of the rotation stage 110 of the optical fiber alignment system illustrated in FIG. 1A according to another example embodiment. As noted above, the rotation stage 110 may include the rotator assembly 114 and the drive assembly 116. As shown, the static immobilizer 112 may be positioned adjacent to rotation stage 110. A blowup view 150 of rotation stage 110 provides a front view facing towards rotation stage 110 as viewed from static immobilizer 112. Rotation stage 110 may be configured to receive an optical fiber 102. To receive optical fiber 102, rotation stage 110 may include the channel 109. Channel 109 may be an optical fiber channel through which rotation stage 110 receives optical fiber 102. Channel 109 may extend from a first end 103 of rotation stage 110 to a second end 105 of rotation stage 110. Channel 109 may extend parallel to a central axis 101 of rotation stage 110. As shown, optical fiber 102 may be disposed in channel 109.

As noted above, to secure optical fiber 102 during rotation of rotation stage 110, rotation stage 110 may include mechanical immobilizer 118. In some embodiments, optical fiber 102 may extend out in a cantilevered fashion from channel 109 of rotation stage 110. Mechanical immobilizer 118 may be positioned to contact the portion 107 of optical fiber 102 that extends outside channel 109. Mechanical immobilizer 118 may be configured to secure optical fiber 102 when rotation stage 110 rotates about central axis 101. For example, mechanical immobilizer 118 may include two pads positioned on either side of optical fiber 102 that may contact optical fiber 102 and mechanically constrain optical fiber 102 during rotation. Mechanical immobilizer 118 may maintain the physical position of optical fiber 102 while rotating optical fiber 102 about central axis 101. In other words, the coordinates of optical fiber 102 remain unchanged during rotation. In some cases, mechanical immobilizer 118 may provide a compression force to optical fiber 102 to secure optical fiber 102 during rotation. In some embodiments, mechanical immobilizer 118 may be positioned between rotation stage 110 and static immobilizer 112.

To rotate rotation stage 110, rotator assembly 114 may include a rotator hub 122, a drive sprocket 124, and one or more rollers 126. Drive assembly 116 may be mechanically coupled to rotator assembly 114 to rotate rotation stage 110. Specifically, drive assembly 116 may include a motor (not shown) that transfers rotational energy to drive sprocket 124, which in transfers the rotational energy to rotator hub 122 and rollers 126, thereby rotating optical fiber 102 in optical fiber channel 109.

Figure 1D:
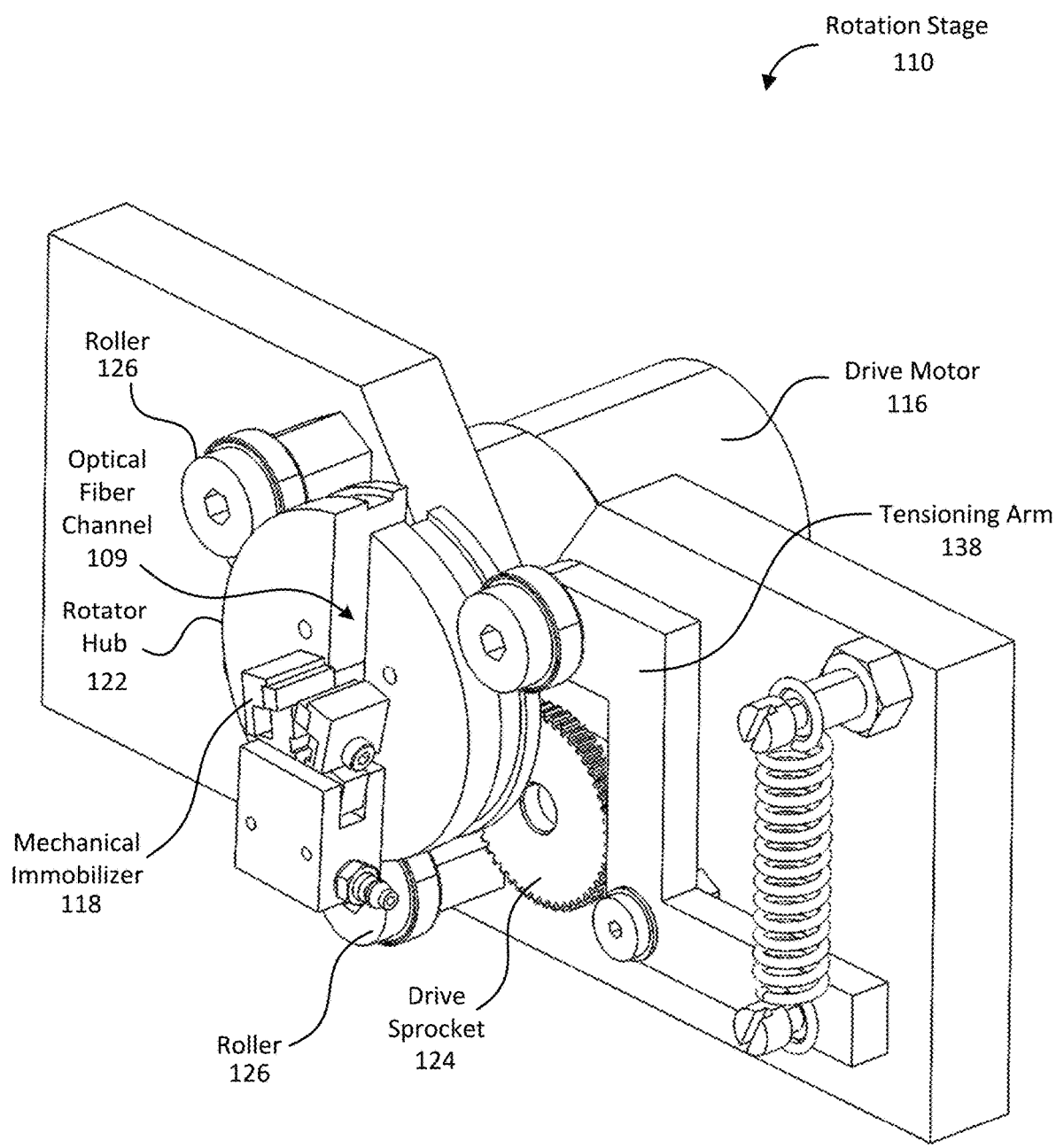
FIG. 1D is a schematic diagram illustrating the components of the rotation stage illustrated in FIGS. 1A-C.

FIG. 1D provides a more detailed schematic diagram illustrating the components of the rotation stage 110 illustrated in FIGS. 1A-C. FIG. 1D depicts an example embodiment of rotation stage 110. As shown, rotation stage 110 may include various components for rotating rotation stage 110. For example, rotation stage 110 may include the drive motor 116. Drive motor 116 may provide mechanical energy for rotating rotation stage 110. Drive motor 116 may be mechanically coupled with the drive sprocket 124. Drive sprocket 124 may, in turn, be mechanically coupled with one or more rollers 126. One or more rollers 126 may be positioned such to transfer rotational energy from drive sprocket 124 to a rotator hub 122. Rotator hub 122 may include an optical fiber channel 109 for disposing an optical fiber therein. The mechanical immobilizer 118 may be positioned adjacent to optical fiber channel 109 such to grasp or secure an optical fiber when disposed within optical fiber channel 109. Accordingly, when rotator hub 122 rotates, the optical fiber disposed within optical fiber channel 109 rotates along with rotator hub 122. In some embodiments, rotation stage 110 may include a tensioning arm 138. Tensioning arm 138 may cause one or more rollers 126 to apply friction to rotator hub 122. By applying tension to rotator hub 122, the speed and rotation angle of rotator hub 122 may be controlled in a precise manner.

Figure 1E:
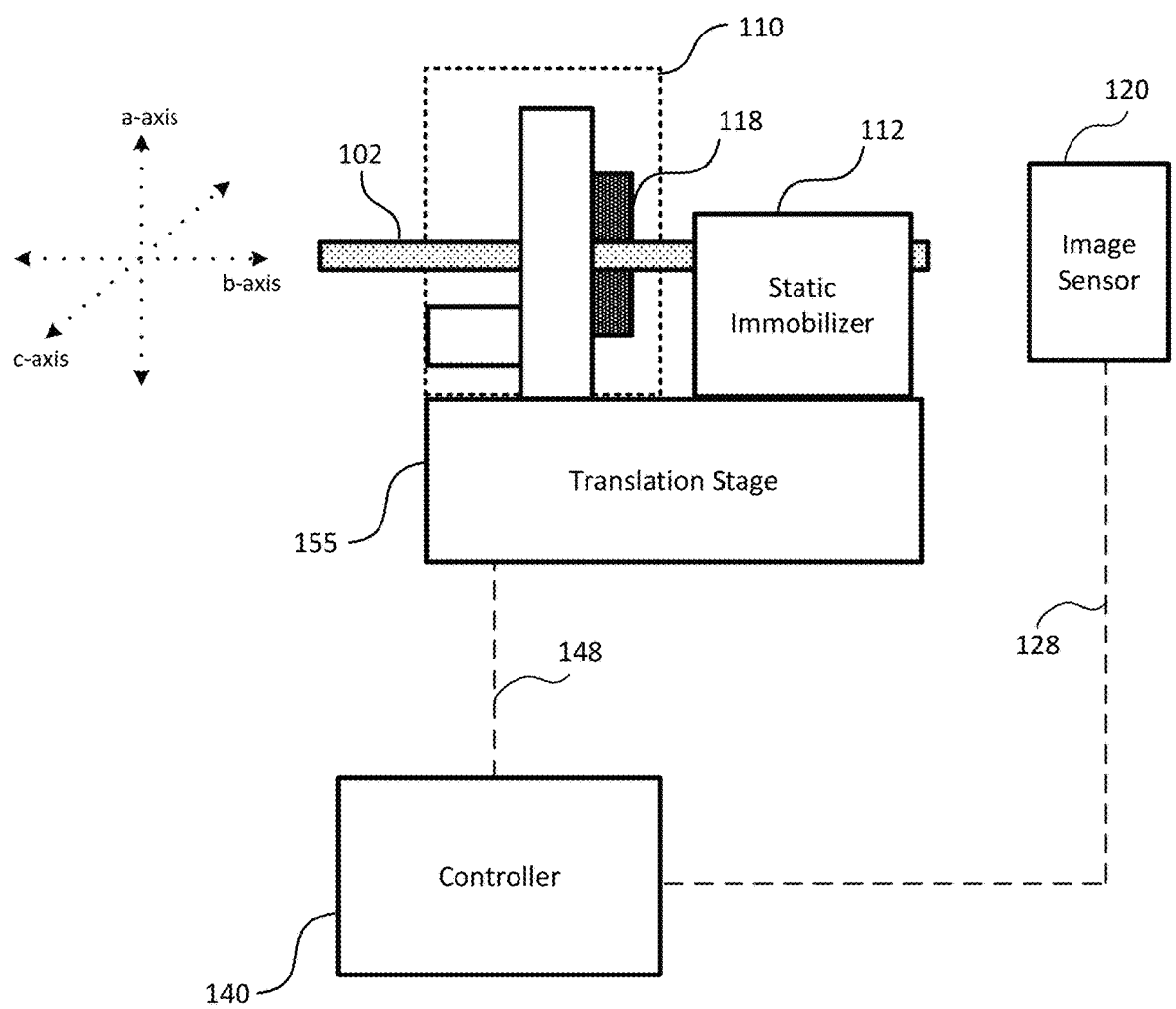
FIG. 1E is a simplified schematic diagram illustrating components of the rotation stage of the optical fiber alignment system illustrated in FIGS. 1A-D according to some embodiments.

In some embodiments, the optical fiber alignment system described herein may also include a translation stage. FIG. 1E provides a simplified schematic diagram illustrating components of the optical fiber alignment systems illustrated in FIGS. 1A-D including a translation stage 155, according to some embodiments. Although, optical fiber alignment system 100E is depicted in this configuration, it should be understood that optical fiber alignment system 100E may be configured in other configurations, such as the optical fiber alignment system configuration depicted in FIGS. 1A-D.

In some cases, optical fiber 102 disposed within rotation stage 110 may need to be translated (i.e., the position of the optical fiber may be adjusted up/down or right/left in directions orthogonal to the axis of rotation) in addition to being rotated. For example, as shown, optical fiber 102 may be adjusted up or down along an a-axis, forward or backward with respect to the image sensor along a b-axis, and left or right along a c-axis. To align optical fiber 102 with an external body, optical fiber 102 may need to be adjusted along the a-axis, the b-axis, and/or the c-axis to align with one or more components of the external body. The a-axis, the b-axis, and the c-axis may correspond to a spatial y-axis, a spatial x-axis, and a spatial z-axis.

To translate optical fiber 102, optical fiber alignment system 100E may include translation stage 155. Translation stage 155 may be operationally coupled with rotation stage 110. In some embodiments, translation stage 155 may adjust rotation stage 110 along the a-axis and/or c-axis with relation to an external body (not shown). Translation stage 155 may also be positioned to adjust static immobilizer 112. The mechanical immobilizer 118 may be positioned between rotation stage 110 and static immobilizer 112.

Translation stage 155 may be operationally coupled with controller 140 via communication line 148. In an exemplary scenario, image sensor 120 may generate an image of an emission face of optical fiber 102 and transmit the image of the emission face to controller 140 via communication line 128. Controller 140 may determine that optical fiber 102 has a translational offset. Based on the translational offset, controller 140 may transmit instructions to translation stage 155 via communication line 148 to translate optical fiber 102. Based on the instructions received from controller 140, translation stage 155 may adjust rotation stage 110 to translate optical fiber 102 accordingly. For example, translation stage 155 may raise or lower rotation stage 110. In some cases, translation stage 155 may adjust rotation stage 110 from side-to-side. Although not shown, translation stage 155 may include a mechanical or motorized means of moving rotation stage 110.

It should be appreciated that the optical fibers discussed herein, such as optical fiber 102, may be rotated and translated simultaneously or concurrently. In other cases, rotation and translation of an optical fiber may be done sequentially or at different stages of an alignment process.

Figure 2A:
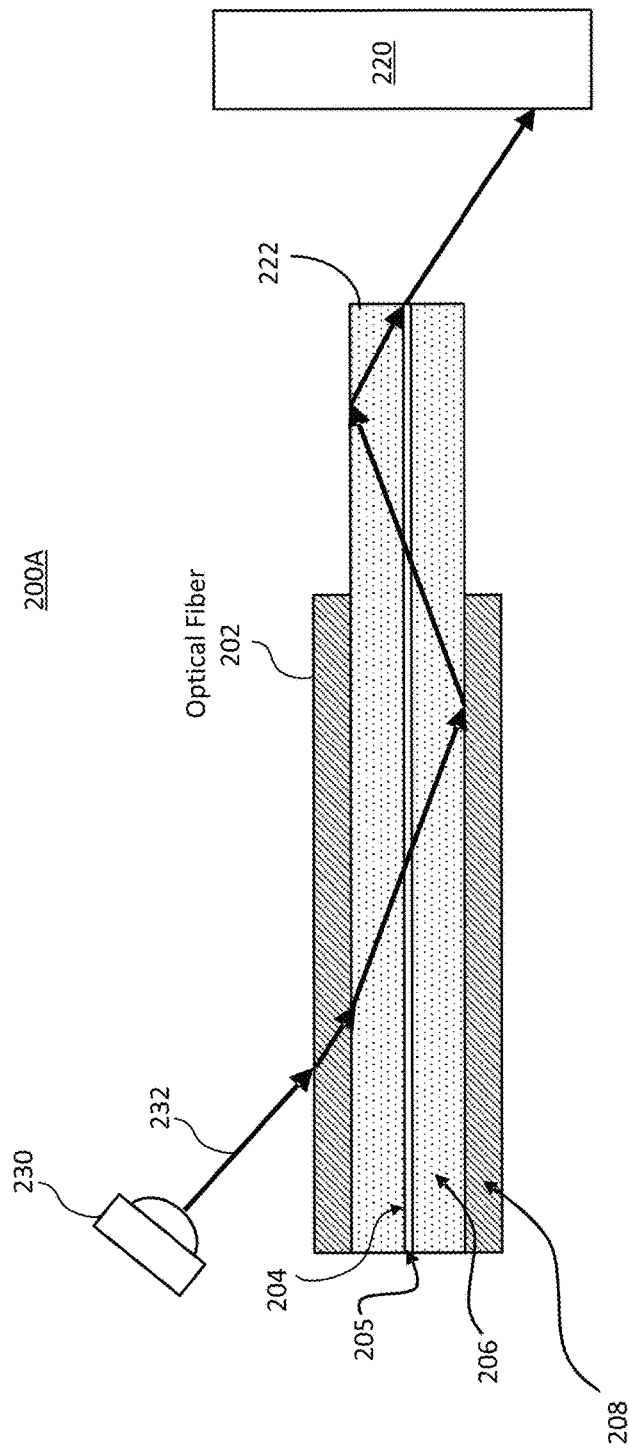
FIG. 2A is a simplified schematic diagram illustrating components of the optical fiber alignment system illustrated in FIGS. 1A-E.

FIG. 2A is a simplified schematic diagram illustrating components of the optical fiber alignment system illustrated in FIGS. 1A-E. As illustrated in FIG. 2A, schematic side view 200A of light emission onto and through an optical fiber 202 is shown. Optical fiber 202 maybe the same as optical fiber 102. Light source 230, which may be the same as light source 130, may emit light 232 onto optical fiber 202. As shown in FIG. 2A, optical fiber 202 may include a core 205, a pair of stress rods 204 disposed adjacent the core 205, a cladding 206 surrounding the core and enclosing the pair of stress rods 204, and a buffer 208. Buffer 208 may contain material that provides stress relief to glass within optical fiber 202. As illustrated in FIG. 2A, a portion of buffer 208 has been removed for purposes of clarity.

As shown in FIG. 2A, light 232 coupled into optical fiber 202 from the side of optical fiber 202 propagates in optical fiber after entry. In some embodiments, the buffer 208 is removed to facilitate optical coupling into the fiber, whereas in other embodiments, light is coupled through the buffer 208 into the optical fiber 202. In contrast with some techniques for coupling light into an optical fiber, embodiments of the present invention provide methods and systems that couple light into the optical fiber with improved tolerance metrics because of the large range of oblique angles that can be utilized.

As will be evident to one of skill in the art, for a polarization maintaining fiber, if the polarization state of light propagating in the polarization maintaining fiber is aligned either parallel to or perpendicular to the axis passing through the stress rods, then the polarization state of light propagating in the polarization maintaining fiber will be maintained as light propagates through the polarization maintaining fiber. Therefore, embodiments of the present invention provide methods and systems to determine the angular orientation of the optical fiber and, as a result, the polarization state of the light emitted from the polarization maintaining fiber. Determination of the angular orientation of the optical fiber may be useful when aligning and splicing the optical fiber with an optical element, such as another optical fiber.

Figure 2B:
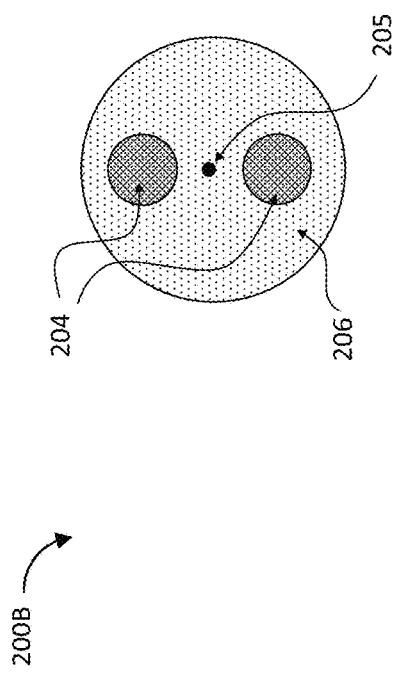
FIG. 2B is a diagram illustrating an image of an emission face of an optical fiber obtained using the optical fiber alignment system illustrated in FIGS. 1A-E.

FIG. 2B is a diagram illustrating an image of an emission face 200B of an optical fiber 202 obtained using the optical fiber alignment system illustrated in FIGS. 1A-E. Image sensor 220 may be positioned to generate an image of the emission face of the optical fiber 202. Image sensor 220 may be the same as image sensor 120 and may generate an image of emission face 200B as viewed from a position adjacent the end of the optical fiber. In operation, light is coupled into the cladding of the optical fiber and propagates through the fiber, exiting at cleaved end 222 of the optical fiber 202. As the light exits the cleaved end 222 of the optical fiber 202, the exiting light can be imaged based on the portion of emitted light 232 that exits the cleaved end 222 of the optical fiber 202. The image may show stress rods 204, core 205, and cladding 206 of optical fiber 202 as a result of the differing indices of refraction associated with stress rods 204, core 205, and cladding 206 of optical fiber 202. As described more fully herein, the contrast of the image can be high enough to identify stress rods 204, core 205, and cladding 206 of optical fiber 202. Thus, using embodiments of the present invention, the polarization axis of the optical fiber, which can be related to the angular positions of the stress rods, can be aligned with respect to a reference frame using the image that shows the various components of the optical fiber. It should be appreciated that while the following discussion relates to an optical fiber having two stress rods and a core, the presence of the stress rods, the number of stress rods, and the like may vary depending on the type of optical fiber.

FIG. 3A is an exemplary emission image 300A depicting an optical fiber having a rotational offset according to an embodiment of the present invention. The image 300A was generated using an image sensor of the optical fiber alignment system illustrated in FIGS. 1A-E. As shown, emission image 300A may include portions that can be identified as corresponding to the stress rods 304, the core 305, and the cladding 306 of optical fiber 102. The optical fiber was placed in the optical fiber alignment system in a manner that resulted in the stress rods, rather than being aligned with a vertical axis, as illustrated in FIGS. 1A-E, being rotated around the central axis by a given amount, which can be referred to as a rotational offset. As described herein, by measuring the rotational offset and rotating the optical fiber by an amount equal to the rotational offset, the optical fiber can be aligned to a reference frame.

In image 300A, stress rods 304 are shown as darker circles within the lighter cladding 306. Core 305 is also shown as a darker spot within cladding 306. Typically, core 305 is positioned near a central point of cladding 306 as shown in FIG. 3A. The axis passing through stress rods 304 and core 305 is tilted to the right with respect to the vertical axis and this rotation will be characterized as a rotational offset.

FIG. 3B is a diagram illustrating a computational image 300B used to calculate the rotational offset of the optical fiber 102 imaged in FIG. 3A. For alignment purposes, it may be desirable that stress rods 304 be vertically aligned along a y-axis. To calculate the rotational offset of optical fiber 102, computational image 300B may be generated based on emission image 300A. One of several image processing methods can be utilized to detect and/or identify the various components of the optical fiber. Thus, computational image 300B may include regions associated with stress rods 304 and core 305. To identify stress rods 304 and core 305, a first region 314A and a second region 314B may be identified in emission image 300A. The first region 314A and the second region 314B may be identified by a grey-scale or color difference between stress rods 304 and cladding 306 within emission image 300A. Similarly, core 305 may be identified within emission image 300A by a grey-scale or color difference with cladding 306. As will be evident to one of skill in the art, the geometrical structures present in optical fiber 102 may be utilized as part of the image processing techniques. Thus, for the illustrated optical fiber, the circular cross-sectional shape of the core, stress rods, and cladding can be utilized in identifying these structures.

Once first region 314A and second region 314B are identified, vertical and horizontal x-y coordinates for first region 314A and second region 314B may be determined. Vertical and horizontal x-y coordinates may also be determined for a central region 315, corresponding to core 305, and a general region 316, corresponding to cladding 306. Computational image 300B may be generated based on the vertical and horizontal x-y coordinates.

A degree of rotational offset may be calculated from first region 314A and second region 314B. To calculate the degree of rotational offset, a vertical rotation offset, $\theta_y$, may be determined, from both first region 314A and second region 314B. The vertical rotation offset, $\theta_y$, may be determined by identifying a vertical offset axis 350. Vertical offset axis 350 may be determined by aligning the center of first region 314A, second region 314B, and central region 315. The vertical rotation offset, $\theta_y$, may be determined by comparing vertical offset axis 350 to the vertical y-axis. The degree to which vertical offset axis 350 is rotated from the vertical y-axis may be the vertical rotation offset, $\theta_y$. Using the vertical rotation offset, $\theta_y$, the degree of rotational offset may be determined from first region 314A and second region 314B. The rotational offset may be determined based on the degree of rotational offset of optical fiber 102.

The rotational offset may be used to determine whether optical fiber 102 is within an alignment tolerance with respect to a reference frame or an external body. For alignment of optical fiber 102 with respect to the external body, stress rods 304 may need to be at a specific angular orientation. For example, if optical fiber 102 is to be spliced with another optical fiber, stress rods 304 may need to be orientated so that they align with the stress rods of the other optical fiber. Accordingly, the rotational offset may be used to determine the orientation of optical fiber 102, and specifically, the orientation of stress rods 304.

If the rotational offset of optical fiber 102 is determined to be within an alignment tolerance, then optical fiber 102 may be released from the optical fiber alignment system. However, if the rotational offset of optical fiber 102 is not within the alignment tolerance, then optical fiber 102 may be rotated, or otherwise adjusted, to orient optical fiber 102 to a predetermined angular orientation. The alignment tolerance may vary depending on application. For example, in some applications, such as fusion splicing, the alignment tolerance may be small, thereby allowing minimal variation in orientation of optical fiber 102. In other applications, the alignment tolerance may be larger, thereby allowing more flexibility with respect to the angular orientation of optical fiber 102.

When the rotational offset of optical fiber 102 is not within the alignment tolerance, optical fiber 102 may be rotated using the optical fiber alignment system illustrated and described with respect to FIGS. 1A-E. A rotation angle may be determined based on the rotational offset of optical fiber 102. The rotation angle may be the degree or amount of rotation necessary for vertical offset axis 350 to align with the vertical y-axis.

After rotating optical fiber 102 based on the degree of rotation, another emission image of optical fiber 102 may be generated by an image sensor. As is discussed in greater detail below with respect to FIGS. 8A-D, in some embodiments, the optical fiber 102 may be both rotated and translated until the rotational offset and a translational offset are corrected.

FIG. 4A is an exemplary emission image depicting the optical fiber of FIG. 3A after rotation to correct the rotational offset using the optical fiber alignment system illustrated in FIGS. 1A-E. In FIG. 4A, an exemplary emission image 400A is shown depicting the optical fiber of FIG. 3A after rotation to correct the rotational offset using the optical fiber alignment system illustrated in FIGS. 1A-E. Similar to emission image 300A, emission image 400A illustrates components of the optical fiber 102 present at the plane defined by the emission face of optical fiber 102 and depicts stress rods 304, core 305, and cladding 306. The angular orientation, because of the rotation of the optical fiber, results in stress rods 304, core 305, and cladding 306 being illustrated in emission image 400A being different than the angular orientation shown in emission image 300A.

FIG. 4B is a diagram illustrating a computational image used to verify correction of the rotational offset of the optical fiber illustrated in FIG. 4A. In FIG. 4B, a computational image 400B is used to verify correction of the rotational offset of optical fiber 102 imaged in FIG. 4A. Computational image 400B may be generated from emission image 400A in a similar manner as described above with relation to computational image 300B. As shown, computational image 400B may include a first region 414A and a second region 414B that correspond to stress rods 304 in the rotated position. Computational image 400B may also include a core 415 and a cladding region 416, corresponding to core 305 and cladding 306, respectively, in the rotated position. Unlike computational image 300B, computational image 400B may not have a vertical rotation offset, $\theta_y$, from first region 414A and second region 414B. Instead, when the center of first region 414A, second region 414B, and core 415 are aligned to identify the vertical offset axis 450, vertical offset axis 450 aligns with the vertical y-axis. Accordingly, if determined, the vertical rotation offset, $\theta_y$, would be zero. While the above discussion relates to vertical alignment—aligning vertical offset axis 450 with the vertical y-axis—of the stress rods 304, stress rods 304 may be aligned in any other orientation.

In some embodiments, a translational offset of optical fiber 102 may be determined in addition to the rotational offset. While not shown, the translational offset for optical fiber 102 may be the degree to which optical fiber 102 is translated or positioned in an x-, y-, or z-direction. For example, optical fiber 102 may have a rotational offset such that first region 314A and second region 314B are rotated to not align with an external body. Optical fiber 102 may also have a translational offset such that optical fiber 102 needs to be adjusted to move up, down, right, or left with respect to the external body.

The optical fiber alignment system, and related methods, described herein may also be used for other types of fibers and/or configuration of stress rods and cores of fibers. In various embodiments, the optical fiber alignment system may be another type of alignment system such as for bow-tie fibers, panda fibers, multi-core fibers, elliptical fibers, photonic crystal optical fibers, and the like.

Figures 5A, 5B:
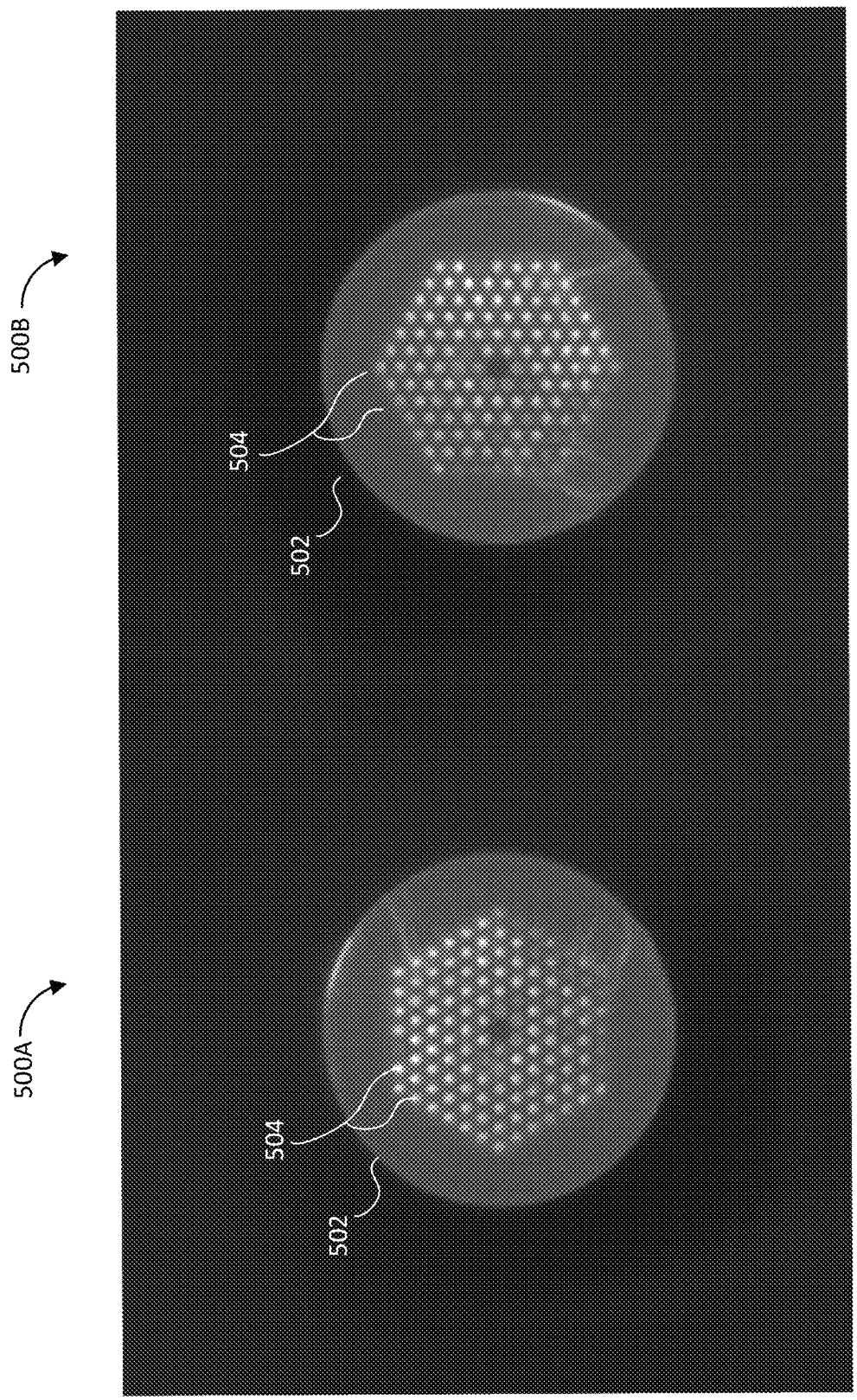
FIG. 5A is an image of a photonic crystal fiber end face obtained using the optical fiber alignment system illustrated in FIGS. 1A-E.
FIG. 5B is an image of the photonic crystal fiber end face after rotation to correct a rotational offset obtained using the optical fiber alignment system illustrated in FIGS. 1A-E.

FIG. 5A is an image of a photonic crystal fiber end face obtained using the optical fiber alignment system illustrated in FIGS. 1A-E. FIG. 5A is an image 500A illustrating the components of optical fiber 102 present at a plane defined by the emission face of optical fiber 102 before alignment using an optical fiber alignment system, such as optical fiber alignment system 100A of FIGS. 1A-E. The emission face of photonic crystal optical fiber 102 may have a rotational offset. Photonic crystal optical fiber 102 may be rotated using an optical fiber alignment system based on the rotational offset and, after rotation of the photonic crystal optical fiber 102, an image 500B of an emission face of the photonic crystal optical fiber 102 may be generated.

FIG. 5B is an image of the photonic crystal fiber end face after rotation to correct a rotational offset using the optical fiber alignment system illustrated in FIGS. 1A-E. Although, photonic crystal optical fiber 102 does not contain any rods, the presence of multiple cores 504 enables a similar technique for determining a rotational offset for photonic crystal optical fiber 102 may be used as described above with relation to FIGS. 3A, 3B, 4A, and 4B. Then based on the rotational offset, a rotation angle may be determined for photonic crystal optical fiber 102. Thus, image 500B depicts the emission face of photonic crystal optical fiber 102 after rotating photonic crystal optical fiber 102 by the rotation angle. As illustrated, by FIGS. 5A and 5B the rotation angle was approximately 10 degrees.

Figure 6:
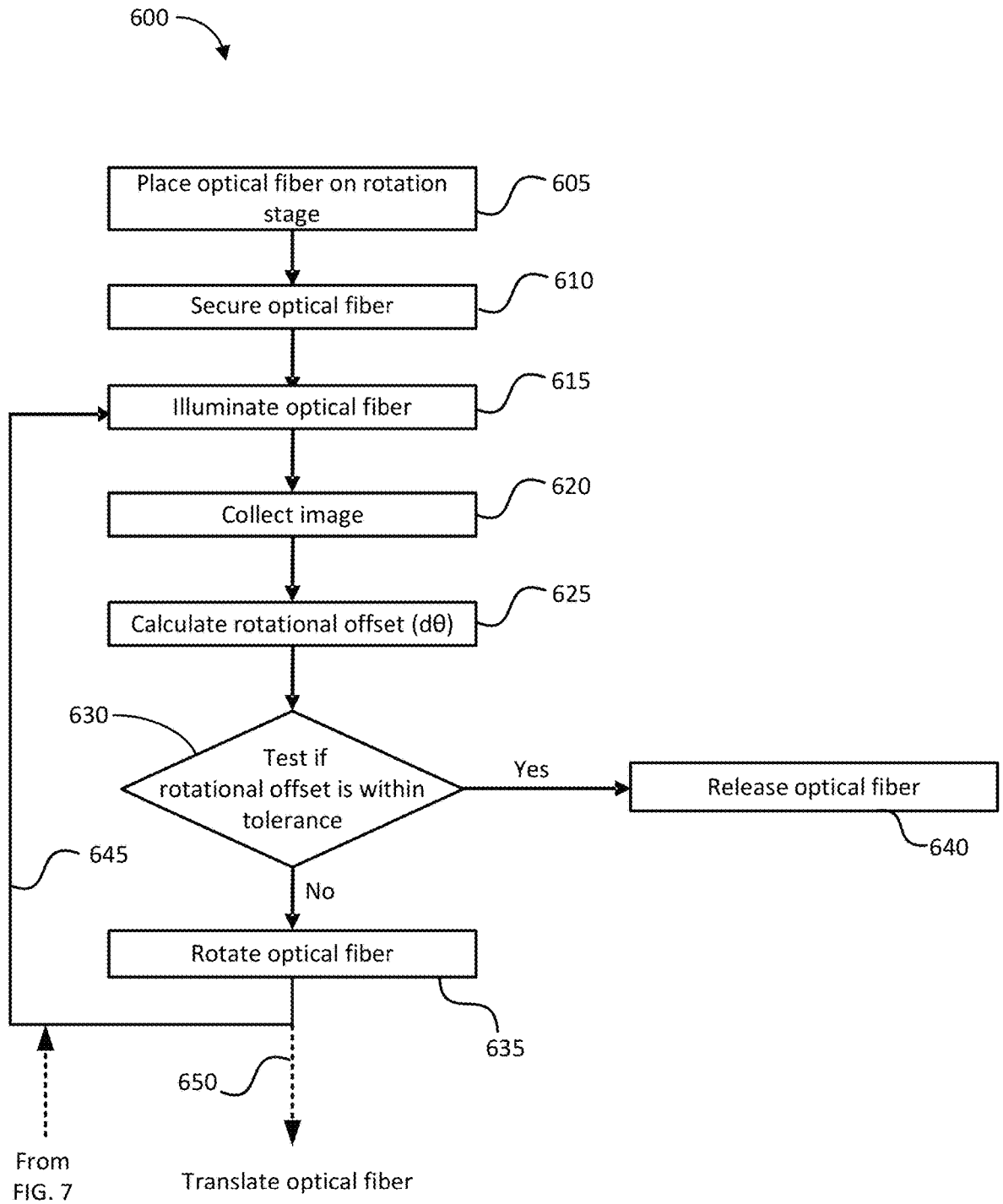
FIG. 6 is a simplified flowchart illustrating a method of aligning a fiber according to an embodiment of the present invention.

FIG. 6 is a simplified flowchart illustrating a method 600 of aligning a fiber according to an embodiment of the present invention. For ease of discussion, method 600 is described with reference to elements of FIGS. 1A and 1B.

Method 600 includes placing an optical fiber on a rotation stage (605). Referring to FIGS. 1A-E, optical fiber 102 can be placed on rotation stage 110, for example, disposing optical fiber 102 in a channel 109 of rotation stage 110. The method also includes securing the optical fiber with respect to the rotation stage (610). In some embodiments, securing the optical fiber on the rotation stage may include contacting the optical fiber with a vacuum chuck, and inducing a vacuum on the optical fiber using the vacuum chuck. For example, referring to FIGS. 1A-E, securing optical fiber 102 in place with respect to rotation stage 110 may include contacting a portion 113 of optical fiber 102 with a static immobilizer 112 being a vacuum chuck and inducing a vacuum on optical fiber 102 using the vacuum chuck.

The method further includes illuminating the optical fiber on the rotation stage (615). In some embodiments, illuminating the optical fiber on the rotation stage may include emitting light onto the optical fiber at an oblique angle from the optical fiber. For example, with reference to FIGS. 1A-E, optical fiber 102 may be illuminated by a light source 130 on rotation stage 610. In some embodiments, illuminating optical fiber 102 may include emitting light onto optical fiber 102 at an oblique angle from optical fiber 102. The method also includes collecting an initial image of an emission face of the optical fiber (620). Referring to FIGS. 1A-E, the initial image of the emission face of optical fiber 102 may be collected, for example, using an image sensor 120.

The method may include calculating a rotational offset of the optical fiber based on the initial image (625). For example, with reference to FIGS. 1A-E, a rotational offset of optical fiber 102 may be calculated. The rotational offset may be calculated using the initial image of the emission face of optical fiber 102. In some embodiments, calculating the rotational offset of the optical fiber based on the initial image may further include identifying a first region and a second region in the initial image of the emission face of the optical fiber, calculating a degree of rotational offset of the optical fiber based on the first region and the second region, and calculating the rotational offset based on the degree of rotational offset. In some cases, the method may also further include identifying a central region of the optical fiber in the initial image of the emission face of the optical fiber, determining a vertical axis of the optical fiber based on the central region, and determining a vertical rotation offset from the vertical axis for the first region and the second region in the emission face. In some embodiments, the method may include determining a translation offset of the optical fiber, as discussed in greater detail with respect to FIG. 7.

The method may also include testing if the rotational offset is within an alignment tolerance (630). In some embodiments, the method may further include calculating a translational offset of the optical fiber and determining if the translational offset of the optical fiber is within the tolerance. If the rotational offset is within the alignment tolerance, then the method includes releasing the optical fiber (640). For example, with reference to FIGS. 1A-E, the optical fiber 102 may be released from rotation stage 110. Releasing optical fiber 102 may include releasing the vacuum applied by the vacuum chuck onto optical fiber 102. Once optical fiber 102 is released, optical fiber 102 may be removed from rotation stage 110.

If the rotational offset is not within the alignment tolerance, then the method includes rotating the optical fiber on the rotation stage (635). Referring to FIGS. 1A-E, optical fiber 102 may be rotated on rotation stage 110, for example. Rotating optical fiber 102 may include releasing optical fiber 102, for example, by releasing the vacuum applied by the vacuum chuck onto optical fiber 102. In some embodiments, the method may include prior to rotating the optical fiber on the rotation stage, releasing the optical fiber. For example, with reference to FIGS. 1A-E, prior to rotating optical fiber 102, optical fiber 102 may be secured for rotation via a mechanical immobilizer. Mechanical immobilizer 118 may secure optical fiber 102 onto rotation stage 110 during rotation. Rotation stage 110 may rotate optical fiber 102 based on the rotational offset. In some cases, this may include rotating optical fiber 102 to a rotation angle determined based on the rotational offset.

In some embodiments, calculating a rotation angle based on the rotational offset and rotating the optical fiber on the rotation stage based on the rotational offset may further include rotating the optical fiber to the rotation angle on the rotation stage.

Method includes iteratively collecting at least one more additional image of the emission face of optical fiber (645). For example, the method may iteratively repeat, collecting a new image at each iteration, until the rotational offset of the optical fiber is within the alignment tolerance and the optical fiber is released (640).

In some embodiments, the method 600 may include translating the optical fiber (650). In such embodiments, the method 600 may continue to method 700 on FIG. 7.

Figure 7:
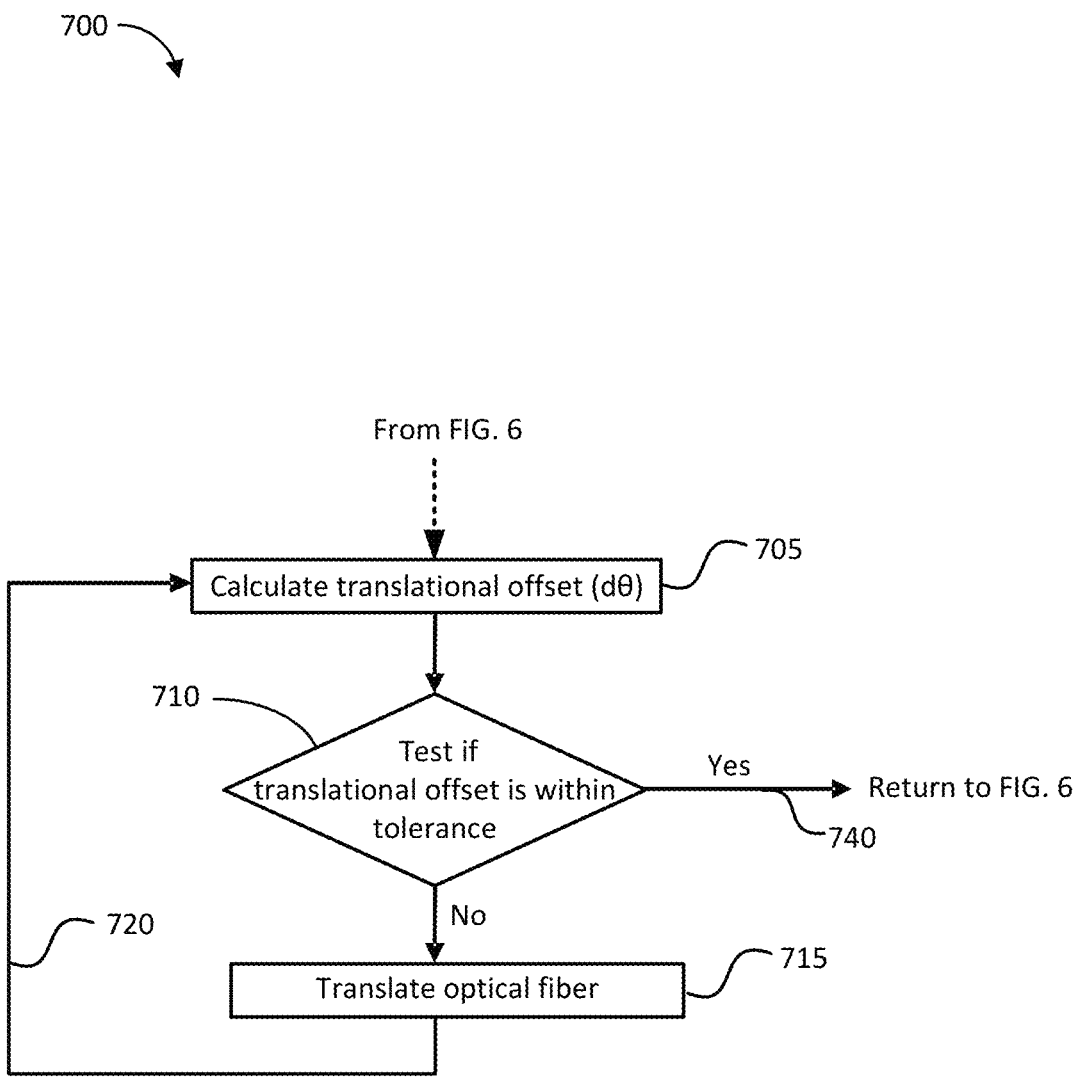
FIG. 7 is a simplified flowchart illustrating method of aligning a fiber involving translation according to an embodiment of the present invention.

FIG. 7 provides a simplified flowchart illustrating method of aligning a fiber involving translation according to an embodiment of the present invention. While method 700 is discussed in combination with method 600 it should be understood that both method 600 and method 700 may be performed individually or one or more steps from method 600 may be performed in combination with steps from method 700.

The method 700 may include calculating a translational offset (705). The translational offset may calculated based off of images captured at step 625 from method 600. In an example, with reference to FIGS. 1A-E, a translational offset of optical fiber 102 may be calculated. The translational offset may be calculated using the initial image of the emission face of optical fiber 102. A more detailed description of calculating a translational offset is discussed with respect to FIGS. 8A-D.

The method 700 may also include testing if the translational offset is within an alignment tolerance (710). If the translational offset is within the alignment tolerance, then the method may return to FIG. 6, specifically, the method 700 may return to step 645 of FIG. 6. For example, the method may continue with rotating and translating the optical fiber until at least one of the rotational offset or the translational offset are within the alignment tolerance.

If the rotational offset is not within the alignment tolerance, then the method 700 may include translating the optical fiber (715). Referring to FIGS. 1A-E, optical fiber 102 may be translated on rotation stage 110 by translation stage 155, for example. Translating optical fiber 102 may include releasing optical fiber 102, for example, by releasing the vacuum applied by the vacuum chuck onto optical fiber 102. In some embodiments, the method may include prior to translating the optical fiber on the rotation stage 110, securing the optical fiber. For example, with reference to FIGS. 1A-E, prior to translating optical fiber 102, optical fiber 102 may be secured for translation via the mechanical immobilizer 118. Mechanical immobilizer 118 may secure optical fiber 102 onto rotation stage 110 during translation. Translation stage 155 may translate optical fiber 102 on the rotation stage 110 based on a translational offset.

Once the optical fiber is translated, the method may return to step 705 via step (720). In some embodiments, step 720 may include one or more of steps 610, 615, and/or 620 to calculate a new translational offset for the optical fiber at the new translation position.

It should be appreciated that the specific steps illustrated in FIGS. 6 and 7 provide a particular method of 600 and/or 700 according to an embodiment of the present invention. Other sequences of steps may also be performed according to alternative embodiments. For example, alternative embodiments of the present invention may perform the steps outlined above in a different order. Moreover, the individual steps illustrated in FIGS. 6 and 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Referring now to FIGS. 8A-8D, an example embodiment for calculating a translational offset and correcting the translational offset, along with a rotational offset, is provided. FIG. 8A is a diagram illustrating a first position of an emission face of a first fiber obtained using the optical fiber alignment system illustrated in FIGS. 1A-E. FIG. 8B is a diagram illustrating a second position of an emission face of a second fiber obtained using the optical fiber alignment system illustrated in FIGS. 1A-E. FIG. 8C is a diagram illustrating a first target position of the emission face of the first fiber obtained using the optical fiber alignment system illustrated in FIGS. 1A-E. FIG. 8D is a diagram illustrating a second target position of the emission face of the second fiber obtained using the optical fiber alignment system illustrated in FIGS. 1A-E. As discussed more fully below, a series of computational images 800A-D can be used during alignment of a first optical fiber, such as first optical fiber 902A, with an optical component, such as a second optical fiber 902B using the optical fiber alignment system illustrated in FIGS. 1A-E.

Figure 9A:
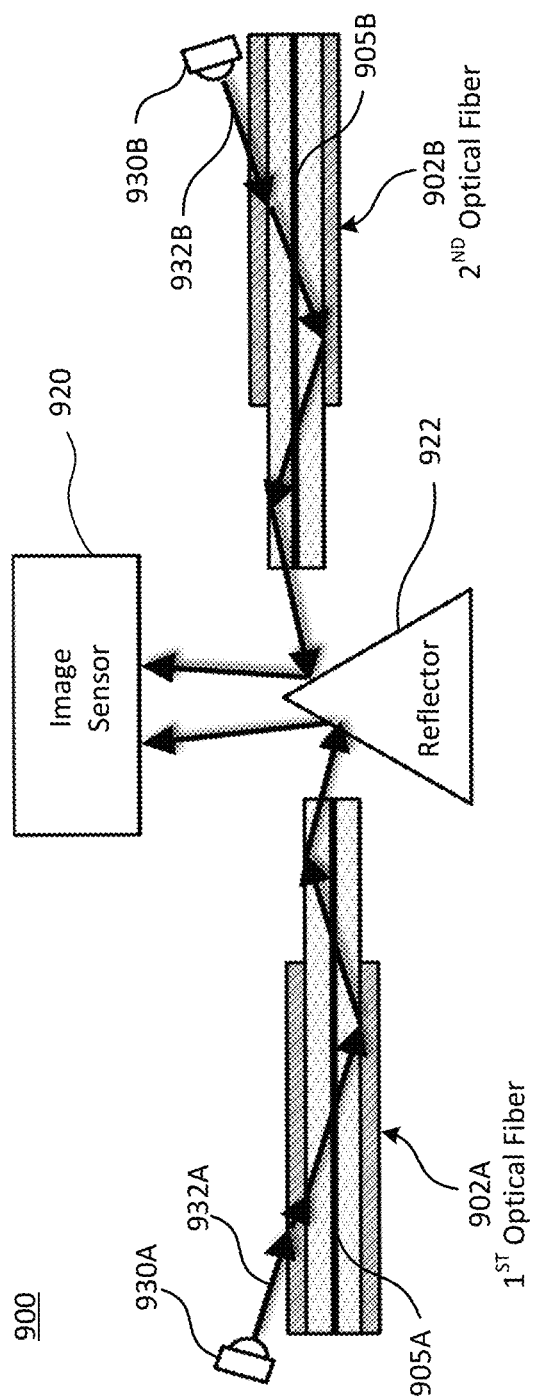
FIG. 9A is a simplified schematic diagram illustrating the components of the optical fiber alignment system prior to alignment of a first fiber and an optical element according to an embodiment of the present invention.

Referring to FIG. 8A, computational image 800A may be generated based off of an initial image generated of a first emission face 802A of a first optical fiber, such as first optical fiber 902A depicted in FIGS. 9A-C. Similarly, as illustrated in FIG. 8B, computational image 800B may be generated based off the initial image generated of a second emission face 802B of a second optical fiber, such as second optical fiber 902B depicted in FIGS. 9A-C. Computational image 800A and computation image 800B may be generated from the same initial image. In other words, a single initial image may generate both first emission face 802A and second emission face 802B. Image processing techniques can be utilized to process a sub-image of the first emission face 802A and a sub-image of the second emission face 802B.

To generate computational image 800A, a first region 812A, a second region 814A, and a first central region 815A may be identified. First region 812A and second region 814A may correspond to the stress rods of first optical fiber 902A and first central region 815A may correspond to the core of first optical fiber 902A. Once first region 812A and second region 814A are identified, vertical and horizontal x-y coordinates for first region 812A and second region 814A as well as first central region 815A may be determined. Based on first region 812A, second region 814A, and central region 815A, a first position 808A may be identified for first emission face 802A.

To generate computational image 800B, a third region 812B, a fourth region 814B, and a second central region 815B may be identified. Third region 812B and fourth region 814B may correspond to the stress rods of second emission face 802B and second central region 815B may correspond to the core of second emission face 802B. Once third region 812B and fourth region 814B are identified, vertical and horizontal x-y coordinates for third region 812B and fourth region 814B as well as second central region 815B may be determined. Based on third region 812B, fourth region 814B, and second central region 815B, a second position 808B may be identified for second emission face 802B.

A first target position 810A for first emission face 802A and a second target position 810B for second emission face 802B may be determined based on the identified first position 808A and identified second position 808B. For example, first target position 810A and second target position 810B may be determined using an overall alignment offset for first emission face 802A and second emission face 802B. The overall alignment offset may be based on a first alignment offset for first emission face 802A and a second alignment offset for second emission face 802B. The alignment offset may be a measurement of the misalignment of first emission face 802A and second emission face 802B.

In particular, first target position 810A may be determined based on the first alignment offset and second target position 810B may be determined based on the second alignment offset. The first alignment offset may include a first rotational offset of first emission face 802A. Similarly, the second alignment offset may include a second rotational offset of second emission face 802B. The first rotational offset and the second rotational offset of emission faces 802A and 802B may be based on a first degree of rotational offset and a second degree of rotational offset, respectively. The first degree of rotational offset may be calculated for first region 812A and second region 814A, and the second degree of rotational offset may be calculated for third region 812B and fourth region 814B. To calculate the first degree of rotational offset, a first vertical rotation offset, $\theta_{yA}$, may be determined, from both first region 812A and second region 814A. Similarly, a second vertical rotation offset, $\theta_{yB}$, may be determined from both third region 812B and fourth region 814B. A first vertical offset axis 850A may be determined based on the first vertical rotation offset, $\theta_{yA}$ and a second vertical offset axis 850B may be determined based on second vertical rotation offset, $\theta_{yB}$. Using the first rotation offset, $\theta_{yA}$, and second rotation offset vertical, $\theta_{yB}$, the first degree and the second degree of rotational offset may be determined for first region 812A and second region 814A, and third region 812B and fourth region 814B, respectively.

In some embodiments, the first alignment offset and the second alignment offset may include a first translational offset and a second translational offset, respectively. The first translational offset and the second translational offset may be the degree to which first emission face 802A and second emission face 802B are translated or misaligned along the z-axis. As depicted in FIGS. 8A and 8B, first emission face 802A may have a minimal, or even non-existent, first translational offset, while second emission face 802B may have a second translational offset. Accordingly, first emission face 802A may not need to be translated to fix the first translational offset while second emission face 802B may require translation (i.e., to be adjusted to move up, down, right, or left) to fix the second translational offset.

As illustrated by FIG. 8C, based on the first degree of rotational offset for first region 812A, second region 814A, and first central region 815A from FIG. 8A, a target first region 822A, a target second region 824A, and a target first central region 825A can be determined. Similarly, as illustrated by FIG. 8D, based on the second degree of rotational offset of third region 812B, fourth region 814B, and second central region 815B from FIG. 8B, a target third region 822B, a target fourth region 824B, and a target second central region 825B can be determined. These target regions illustrate the positions of the corresponding stress rods and cores of first emission face 802A and second emission face 802B if the respective optical fibers were rotated to the target positions 810A and 810B.

Using first region 822A and second region 824A, first target position 810A can be determined. Specifically, a target first vertical offset axis 860A may be determined. Similarly, using third region 822B and fourth region 824B, a target second vertical offset axis 860B may be determined, thereby identifying second target position 810B. As shown, target first vertical offset axis 860A may align with the vertical y-axis. Accordingly, first emission face 802A after adjustment may have an adjusted first vertical rotation offset, $\theta_{yA}$ of zero. Second emission face 802B may also have an adjusted second vertical rotation offset, $\theta_{yB}$, of zero. Accordingly, first emission face 802A and second emission face 802B may be aligned. To verify alignment, an adjusted alignment offset may be calculated for computational images 800C and 800D, as described above. If the adjusted alignment offset is within the alignment tolerance, then first emission face 802A and second emission face 802B may be released from the optical fiber alignment system. In other embodiments, if the adjusted alignment offset is within the alignment tolerance, then the optical fiber alignment system may splice first emission face 802A and second emission face 802B together. It should be understood that in other embodiments, the second optical fiber 902B may be a different optical element. In such cases, the regions 812B, 814B, 822B, and 824B may correspond to one or more components of the optical element to which the regions 812A, 814A, 822A, and 824A are to be aligned.

In some embodiments, first target position 810A and second target position 810B are determined based off of pixels within the initial image used to generate computational image 800A and computational image 800B. For example, the pixel coordinates of first central region 815A of first emission face 802A may be determined and the pixel coordinates of second central region 815B of second emission face 802B may be determined. First central region 815A may be identified as a first central point of first position 808A and second central region 815B may be identified as a second central point of second position 808B. A distance between the first central point of first position 808A and the second central point of second position 808B may be determined. Then, based on the distance between the first central point and the second central point, first target position 810A and second target position 810B may be determined. As shown, first target position 810A and second target position 810B may be determined by aligning the first central point and the second central point at the origin point of computational images 800C and 800D. Depending on the alignment scenario, first emission face 802A may be aligned with second emission face 802B, second emission face 802B may be aligned with first emission face 802A, or first emission face 802A and second emission face 802B may be both adjusted into alignment with each other. Depending on the scenario, first target position 810A and second target position 810B may be identified.

After first target position 810A and second target position 810B are identified, one or both of the first optical fiber and the second optical fiber may be adjusted to a modified position. The modified position may be the position of first optical fiber and second optical fiber such that first emission face 802A is at first target position 810A and second emission face 802B is at second target position 810B. As discussed above, adjusting the position of the first optical fiber and/or second optical fiber may include rotating and/or translating the fibers using the optical fiber alignment system as discussed herein.

FIG. 9A is a simplified schematic diagram illustrating the components of the optical fiber alignment system prior to alignment of a first fiber and with an optical element. according to an embodiment of the present invention. In this example embodiment, the optical element is a second optical fiber, however, it should be understood that the second optical fiber may be any type of optical element to which the first optical fiber is to be aligned and spliced with.

As described in relation to FIGS. 9A-C, two optical fibers can be aligned and spliced using the optical fiber alignment system 900 illustrated herein. As illustrated in FIGS. 9A, a first optical fiber 902A and a second optical fiber 902B are provided. Optical fiber alignment system 900 may be the same or similar to optical fiber alignment system 100A-E in FIG. 1A-E. Although not shown, it is understood that first optical fiber 902A and second optical fiber 902B are disposed within a first rotation stage and a second rotation stage, respectively. In embodiments where the second optical fiber 902B is a different type of optical element, the optical element may not be placed on a second rotation stage as illustrated. Instead, the non-fiber optical element may remain stationary while the first optical fiber 902A is aligned (e.g., rotated and/or translated) into position with the optical element. First optical fiber 902A and second optical fiber 902B may have a first core 905A and a second core 905B, respectively.

A first light source 930A may be positioned to emit light 932A onto first optical fiber 902A. Similarly, a second light source 930B may be positioned to emit light 932B onto second optical fiber 902B. Light 932A emitted onto first optical fiber 902A may enter and propagate through first optical fiber 902A. Similarly, light 932B may enter and propagate through second optical fiber 902B. A first emission face of first optical fiber 902A and a second emission face of second optical fiber 902B may be positioned adjacent to a reflector 922. Reflector 922 may redirect light emitting from first optical fiber 902A and second optical fiber 902B via the first emission face and the second emission face, respectively, to an image sensor 920. Image sensor 920 may generate an initial image of the first emission face of first optical fiber 902A and the second emission face of second optical fiber 902B as illustrated in FIG. 9A.

An alignment offset for first optical fiber 902A and second optical fiber 902B may be determined based on the initial image generated as illustrated in FIG. 9A. Based on the alignment offset, first optical fiber 902A and second optical fiber 902B may be adjusted. After first optical fiber 902A and second optical fiber 902B are adjusted, an additional image of the first emission face and the second emission face may be generated. An adjusted alignment offset may be determined based on the additional image. If the adjusted alignment offset is within an alignment tolerance, then the first optical fiber 902A and second optical fiber 902B may be spliced together. Otherwise, the alignment adjustment process may be repeated until the alignment tolerance is achieved. In addition to rotational alignment, the alignment adjustment process can also include translation of either or both of first optical fiber 902A and second optical fiber 902B prior to splicing.

FIG. 9B is a simplified schematic diagram illustrating the components of the optical fiber alignment system after alignment of the first optical fiber 902A and second optical fiber 902B and prior to contacting the first optical fiber 902A and the second optical fiber 902B according to an embodiment of the present invention. As illustrated in FIG. 9B, reflector 922 may be removed from the initial position disposed between first optical fiber 902A and second optical fiber 902B.

FIG. 9C is a simplified schematic diagram illustrating the components of the optical fiber alignment system after the first optical fiber 902A and the second optical fiber 902B are brought into physical contact according to an embodiment of the present invention. As illustrated in FIG. 10C, first optical fiber 902A and second optical fiber 902B have been joined together at their emission faces and spliced using one of several suitable fiber splicing processes. Thus, utilizing embodiments of the present invention, rotational alignment processes can be utilized to align polarization maintaining fibers so that the polarization state of light propagating in the polarization maintaining fibers can be maintained during propagation despite the presence of the fiber splice.

Figure 10:
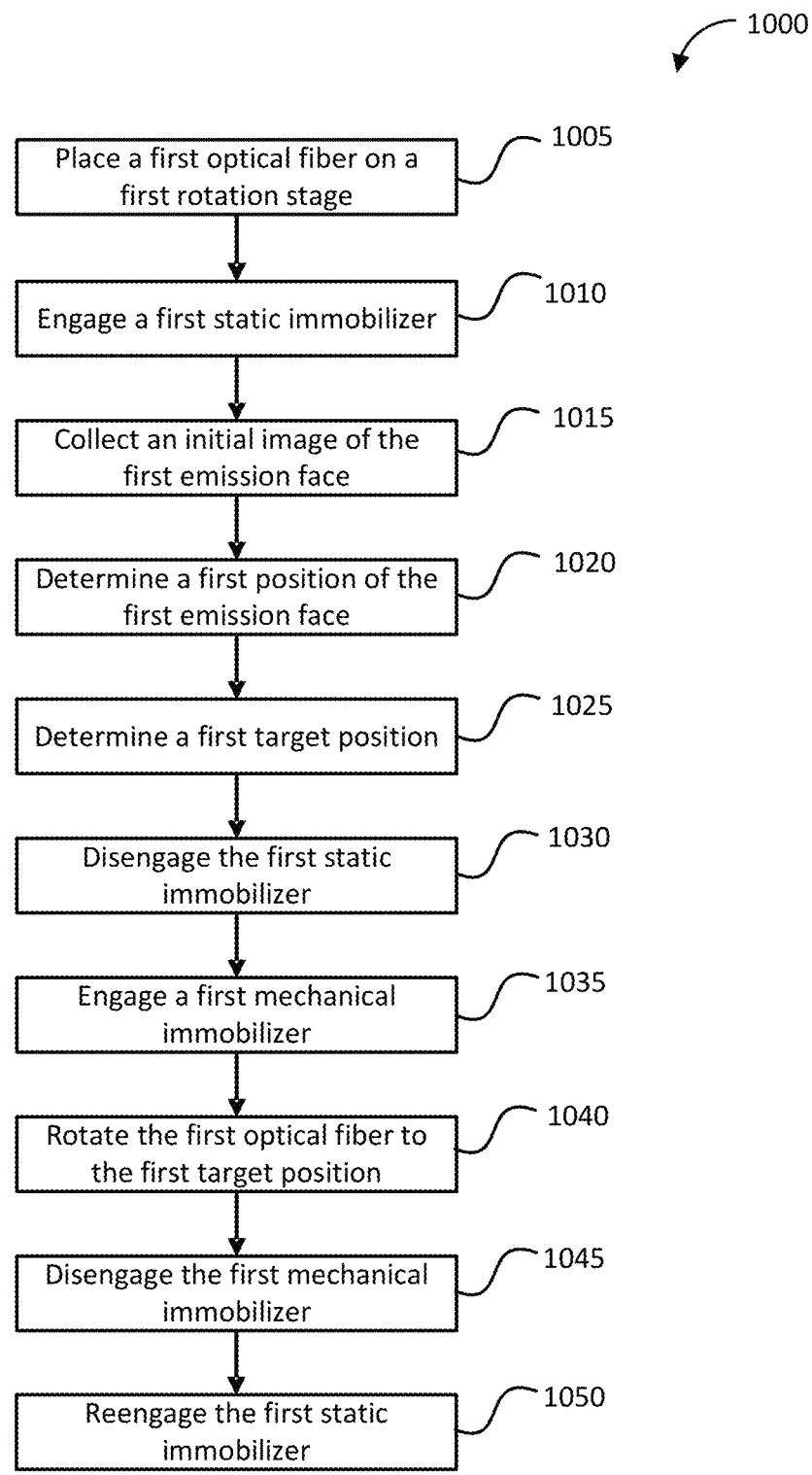
FIG. 10 is a simplified flowchart illustrating a method of aligning an optical fiber according to an embodiment of the present invention.

FIG. 10 is a simplified flowchart illustrating a method 1000 of aligning an optical fiber according to an embodiment of the present invention. For ease of discussion, method 1000 is described with reference to elements of FIGS. 1A-E, however, it will be appreciated that the use of method 1000 is not limited to the particular optical fiber alignment system illustrated in FIGS. 1A-E.

The method includes placing a first optical fiber on a first rotation stage (1005). For example, optical fiber 102 may be placed on rotation stage 110, as described with respect to FIGS. 1A-E. The method also includes engaging a first static immobilizer to secure the first optical fiber on the first rotation stage (1010). For example, the portion 107 of optical fiber 102 may be contacted by static immobilizer 112 and when engaged, static immobilizer 112 may secure portion 107 of optical fiber 102 in place. In some embodiments, the first static immobilizer may be a vacuum chuck and engaging the first static immobilizer may include inducing a vacuum on the first optical fiber using the vacuum chuck.

The method includes collecting an initial image of a first emission face of the first optical fiber (1015). With reference to FIGS. 1A-E, an initial image of a first emission face of first optical fiber 102 may be collected using image sensor 120.

The method also includes determining, based on the initial image, a first position of the first emission face (1020). Based on the first position, a first target position for the first emission face may be determined (1025). The method includes disengaging the first static immobilizer to release the first optical fiber (1030). As noted above, the first static immobilizer may be a vacuum chuck and disengaging the first static immobilizer may include releasing the vacuum applied to the first optical fiber by the vacuum chuck.

The method also includes engaging a first mechanical immobilizer to secure the first optical fiber during rotation (1035). For example, with reference to FIGS. 1A-E, mechanical immobilizer 118 may contact portion 107 of optical fiber 102 to secure optical fiber 102 for rotation. In some embodiments, the first mechanical immobilizer may be engaged (1035) prior to disengagement of the first static immobilizer (1030). In other embodiments, the first mechanical immobilizer may be engaged (1035) simultaneously or concurrently with disengagement of the first static immobilizer (1030) in a single step.

Once the first mechanical immobilizer is engaged, the first optical fiber may be rotated to the first target position (1040). With reference to FIGS. 1A-E, optical fiber 102 may be rotated using rotator assembly 114. Once the first optical fiber is rotated to the first target position, the method may also include disengaging the first mechanical immobilizer to release the first optical fiber (1045).

Optionally, the method may include reengaging the first static immobilizer (1050). In some embodiments, the first optical fiber may be further rotated to a second target position and thus the first static immobilizer may be reengaged before rotating the first optical fiber to the second target position.

In other embodiments, rotation of the first optical fiber to the first target position may require an intermediate position placement of the first optical fiber. For example, the rotational offset of the first optical fiber may require rotation of 180°. To achieve rotation of 180°, the first optical fiber may be rotated 90° in a first step to an intermediate position. Once at intermediate position, the first mechanical immobilizer may disengage (1045) and the first static immobilizer (1050) may reengage. The rotation assembly may adjust back to a neutral position before reengaging the first mechanical immobilizer and disengaging the first static immobilizer for rotating the first optical fiber the additional 90° in a second step to the first target position to achieve the full 180° of rotation. In some embodiments, the rotation stage 110 may be pre-rotated while the optical fiber 102 is immobilized and then rotate the optical fiber 102 to the desired rotation angle such that rotation greater than 90° is achieved in a single step. As will be evident to one of skill in the art, the rotation step size does not need to be 90° and smaller step sizes may be utilized. Moreover, although two equal steps sizes of 90° are utilized in this example, this is not required and the step sizes may be unequal, summing to the desired total rotation angle. One of ordinary skill in the art would recognize many variations, modifications, and alternatives.

Embodiments of the present invention provide for accurate control of the orientation of the longitudinal axis of the optical fiber through the use of the first static immobilizer. As an example, after the first optical fiber is rotated to the first target position and the first mechanical immobilizer is disengaged to release the first optical fiber, the first static immobilizer can be reengaged, for example, by pulling a vacuum to position the first optical fiber in a v-groove extending along the length of the first static immobilizer. Accordingly, after rotation, the longitudinal axis of the first optical fiber is returned to the same position at which it was located prior to rotation.

In other embodiments, the method may further include placing a second optical fiber on a second rotation stage, engaging a second static immobilizer to secure the second optical fiber on the second rotation stage, collecting the initial image, wherein the initial image comprises the first emission face of the first optical fiber and the second emission face of the second optical fiber, determining, based on the initial image, a second position of the second emission face, determining a second target position for the second emission face, disengaging the second static immobilizer to release the second optical fiber, engaging a second mechanical immobilizer to secure the second optical fiber during rotation, rotating the second optical fiber to the second target position, and disengaging the second mechanical immobilizer to release the second optical fiber.

In some embodiments, the method may further include engaging the first static immobilizer to secure the first optical fiber after rotation, collecting a second image of the first emission face, and determining a modified position of the first emission face. Optionally, the method may include determining that the modified position of the first emission face is within a threshold area of the first target position, and disengaging the first static immobilizer to release the first optical fiber.

It should be appreciated that the specific steps illustrated in FIG. 10 provide a particular method of aligning an optical fiber according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

The examples and embodiments described herein are for illustrative purposes only. Various modifications or changes in light thereof will be apparent to persons skilled in the art. These are to be included within the spirit and purview of this application, and the scope of the appended claims, which follow.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is an optical fiber alignment system comprising: a controller; a rotation stage comprising a central axis, a first end, and a second end, wherein the central axis extends from the first end to the second end of the rotation stage, wherein the rotation stage: further comprises an optical fiber channel, wherein the optical fiber channel extends from the first end of the rotation stage to the second end of the rotation stage; is operationally coupled with the controller; and is configured to rotate about the central axis of the rotation stage; a light source positioned to emit light onto the optical fiber channel at an oblique angle from the central axis of the rotation stage; and an image sensor positioned adjacent to the second end of the rotation stage, wherein the image sensor is: positioned to generate an image of an emission face of an optical fiber disposed within the optical fiber channel; and operationally coupled with the controller.

Example 2 is the optical fiber alignment system of any previous or subsequent example further comprising a static immobilizer, wherein the static immobilizer is in contact with a portion of the optical fiber and is configured to secure the optical fiber onto the rotation stage.

Example 3 is the optical fiber alignment system of any previous or subsequent example wherein the static immobilizer is positioned between the rotation stage and the image sensor.

Example 4 is the optical fiber alignment system of any previous or subsequent example wherein the static immobilizer comprises a vacuum chuck.

Example 5 is the optical fiber alignment system of any previous or subsequent example wherein the rotation stage comprises a drive assembly and a rotator assembly.

Example 6 is the optical fiber alignment system of any previous or subsequent example further comprising a mechanical immobilizer, wherein the mechanical immobilizer is configured to secure the optical fiber when the rotation stage rotates about the central axis of the rotation stage.

Example 7 is the optical fiber alignment system of any previous or subsequent example wherein the mechanical immobilizer comprises two pads positioned on either side of the optical fiber channel and configured to contact the optical fiber when positioned in the optical fiber channel.

Example 8 is the optical fiber alignment system of any previous or subsequent example wherein the mechanical immobilizer is positioned between the rotation stage and the static immobilizer.

Example 9 is the optical fiber alignment system of any previous or subsequent example wherein the oblique angle is less than 90° from the central axis of the rotation stage.

Example 10 is the optical fiber alignment system of any previous or subsequent example further comprising an optical fiber provided in the optical fiber channel, wherein the optical fiber comprises one or more stress rods.

Example 11 is the optical fiber alignment system of any previous or subsequent example wherein the image sensor is positioned at the second end of the rotation stage.

Example 12 is a method of aligning an optical fiber, the method comprising: placing an optical fiber onto a rotation stage; securing the optical fiber on the rotation stage; illuminating the optical fiber on the rotation stage; collecting an initial image of an emission face of the optical fiber calculating a rotational offset of the optical fiber based on the initial image; rotating the optical fiber on the rotation stage if the rotational offset of the optical fiber is not within a tolerance; iteratively collecting at least one more additional image of the emission face of the optical fiber; and releasing the optical fiber if the rotational offset of the optical fiber is within the tolerance.

Example 13 is the method of aligning the optical fiber of any previous or subsequent example wherein the method further comprises: calculating a rotation angle based on the rotational offset; and rotating the optical fiber on the rotation stage based on the rotational offset comprises rotating the optical fiber to the rotation angle on the rotation stage.

Example 14 is the method of aligning the optical fiber of any previous or subsequent example wherein prior to rotating the optical fiber on the rotation stage, the method comprises releasing the optical fiber.

Example 15 is the method of aligning the optical fiber of any previous or subsequent example wherein the method further comprises: calculating a translational offset of the optical fiber; and determining if the translational offset of the optical fiber is within the tolerance.

Example 16 is the method of aligning the optical fiber of any previous or subsequent example wherein calculating the rotational offset of the optical fiber based on the initial image comprises: identifying a first region and a second region in the initial image of the emission face of the optical fiber; calculating a degree of rotational offset of the optical fiber based on the first region and the second region; and calculating the rotational offset based on the degree of rotational offset.

Example 17 is the method of aligning the optical fiber of any previous or subsequent example further comprising: identifying a central region of the optical fiber in the initial image of the emission face of the optical fiber; determining a vertical axis of the optical fiber based on the central region; and determining a vertical rotation offset from the vertical axis for the first region and the second region in the emission face.

Example 18 is the method of aligning the optical fiber of any previous or subsequent example wherein the method further comprises determining a translational offset of the optical fiber.

Example 19 is the method of aligning the optical fiber of any previous or subsequent example wherein illuminating the optical fiber on the rotation stage comprises emitting light onto the optical fiber at an oblique angle from the optical fiber.

Example 20 is the method of aligning the optical fiber of any previous or subsequent example wherein securing the optical fiber on the rotation stage comprises: contacting the optical fiber with a vacuum chuck; and inducing a vacuum on the optical fiber using the vacuum chuck.

What is claimed is:
1. An optical fiber alignment system comprising:
a controller;
a rotation stage comprising a central axis, a first end, and a second end, wherein the central axis extends from the first end to the second end of the rotation stage, wherein the rotation stage:
further comprises an optical fiber channel, wherein the optical fiber channel extends from the first end of the rotation stage to the second end of the rotation stage;
is operationally coupled with the controller; and is configured to rotate about the central axis of the rotation stage;

a light source positioned to emit light onto the optical fiber channel at an oblique angle from the central axis of the rotation stage; and an image sensor positioned adjacent to the second end of the rotation stage, wherein the image sensor is:
- positioned to generate an image of an emission face of an optical fiber disposed within the optical fiber channel; and
- operationally coupled with the controller.

2. The optical fiber alignment system of claim 1 further comprising a static immobilizer, wherein the static immobilizer is in contact with a portion of the optical fiber and is configured to secure the optical fiber onto the rotation stage.

3. The optical fiber alignment system of claim 2 wherein the static immobilizer is positioned between the rotation stage and the image sensor.

4. The optical fiber alignment system of claim 2 wherein the static immobilizer comprises a vacuum chuck.

5. The optical fiber alignment system of claim 2 further comprising a mechanical immobilizer, wherein the mechanical immobilizer is configured to secure the optical fiber when the rotation stage rotates about the central axis of the rotation stage.

6. The optical fiber alignment system of claim 5 wherein the mechanical immobilizer comprises two pads positioned on either side of the optical fiber channel and configured to contact the optical fiber when positioned in the optical fiber channel.

7. The optical fiber alignment system of claim 5 wherein the mechanical immobilizer is positioned between the rotation stage and the static immobilizer.

8. The optical fiber alignment system of claim 1 wherein the rotation stage comprises a drive assembly and a rotator assembly.

9. The optical fiber alignment system of claim 1 wherein the oblique angle is less than 90° from the central axis of the rotation stage.

10. The optical fiber alignment system of claim 1 further comprising an optical fiber provided in the optical fiber channel, wherein the optical fiber comprises one or more stress rods.

11. The optical fiber alignment system of claim 1 wherein the image sensor is positioned at the second end of the rotation stage.

* * * * *

UNITED STATES PATENT AND TRADEMARK OFFICE
CERTIFICATE OF CORRECTION

| | | |
|---|---|---|
| PATENT NO. | : 12,298,562 B2 | Page 1 of 1 |
| APPLICATION NO. | : 17/733319 | |
| DATED | : May 13, 2025 | |
| INVENTOR(S) | : Joseph Lawson, Jordan Leidner and Per Adamson | |

It is certified that error appears in the above-identified patent and that said Letters Patent is hereby corrected as shown below:

In the Specification

Please insert the following heading and paragraph in Column 1, Line 15 of the description, immediately following the first full paragraph:
--STATEMENT REGARDING FEDERALLY SPONSORED RESEARCH OR DEVELOPMENT
This invention was made with Government support under Contract N68936-19-F-0001 awarded by The United States Navy. The Government has certain rights in the invention.--

Signed and Sealed this
Third Day of February, 2026

John A. Squires
*Director of the United States Patent and Trademark Office*